(12) United States Patent
Kim et al.

(10) Patent No.: US 6,781,657 B1
(45) Date of Patent: Aug. 24, 2004

(54) METHOD OF PRODUCING TWO DOMAINS WITHIN A LIQUID CRYSTAL LAYER AND LIQUID CRYSTAL DISPLAY DEVICE

(75) Inventors: Hyang Yul Kim, Ich'on (KR); Seung Hee Lee, Ich'on (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/050,292

(22) Filed: Mar. 30, 1998

(30) Foreign Application Priority Data

May 30, 1997 (KR) ............................................ 97-22108

(51) Int. Cl.[7] .................................................. G02F 1/13
(52) U.S. Cl. ..................................... 349/129; 349/130
(58) Field of Search ............................. 349/130, 131, 349/141, 144, 145, 92

(56) References Cited

U.S. PATENT DOCUMENTS

| | | | | |
|---|---|---|---|---|
| 3,807,831 A | * | 4/1974 | Soref .......................... | 349/141 |
| 4,617,646 A | | 10/1986 | Yang | |
| 5,477,358 A | * | 12/1995 | Rosenblatt et al. .......... | 349/130 |
| 5,598,285 A | | 1/1997 | Kondo et al. .................. | 349/39 |
| 5,602,662 A | * | 2/1997 | Rosenblatt et al. .......... | 349/130 |
| 5,608,556 A | * | 3/1997 | Koma .......................... | 349/143 |
| 5,621,558 A | * | 4/1997 | Shimada et al. ............. | 349/130 |
| 5,666,179 A | * | 9/1997 | Koma .......................... | 349/143 |
| 5,757,454 A | * | 5/1998 | Ogishima et al. ............ | 349/129 |
| 5,757,455 A | * | 5/1998 | Sugiyama et al. ........... | 349/129 |
| 6,141,075 A | * | 10/2000 | Ohmuro et al. .............. | 349/130 |
| 6,281,956 B1 | * | 8/2001 | Ohmuro et al. .............. | 349/118 |

FOREIGN PATENT DOCUMENTS

| | | | |
|---|---|---|---|
| GB | 2326012 | 12/1998 | |
| JP | 5389753 | * 8/1978 | ............ G02F/1/133 |
| JP | 1-147431 | 6/1989 | |
| KR | 96-35089 | 10/1996 | |
| WO | 9425893 | 11/1994 | |
| WO | 9739381 | 10/1997 | |

OTHER PUBLICATIONS

Bahadur, Chapter 5, p. 1–63; 1990.*
"Development of Super–TFT–LCDs with In–Plane Switching Display Mode", M. Ohta et al, *Asia Displays '95*, pp. 707–710.
"Rubbing–Free, Vertically Aligned Nematic Liquid Crystal Display Controlled by In–Plane Field", S. Lee et al, *Appl Phys. Lett.* vol. 71, No. 19, Nov. 10, 1997, pp. 1–3.
"Complete Suppression of Color Shift in In–Plane Switching Mode LCDs with a Multidomain Structure Obtained by Unidirectional Rubbing", S. Aratani et al, *Euro Display '96*, Add. 1–4.
"Vertically Aligned Nematic Liquid Crystal Display Controlled by In–Plane Field", S. Lee et al, *First Korean Symposium on Information Display*, Jun. 26–27, 1997, pp. 23–24.
"Wide–Viewing–Angle Homeotropic Nematic Liquid Crystal Display Controlled by In–Plane Field", S. Lee et al, *International Display Workshop*, Nov. 1997, pp. 97–100.
"Rubbing–free, vertically aligned nematic liquid crystal display controlled by in–plane field" by S. H. Lee et al Applied Physics Letters, vol. 71, No. 19, Nov. 10, 1997 pp. 2851–2853.

* cited by examiner

*Primary Examiner*—James A. Dudek

(57) ABSTRACT

A method of producing two domains within a liquid crystal layer by first forming two electrodes on a substrate, using a liquid crystal layer aligned vertically with respect to the substrate formed on the substrate where the substrate has two electrodes separated from each other with a selected distance. Finally, an electric field between the two electrodes is applied.

38 Claims, 14 Drawing Sheets

Dark

Off state

ELECTRODE

ELECTRODE         DISCLINATION LINE

| 90 | : B>90% |
| 70 | : B>70% |
| 50 | : B>50% |
| 30 | : B>30% |

METHOD OF PRODUCING TWO DOMAINS WITHIN A LIQUID CRYSTAL LAYER AND LIQUID CRYSTAL DISPLAY DEVICE

BACKGROUND OF THE INVENTION

This invention relates to a liquid crystal display device and a method of manufacturing the liquid crystal display device, and more particularly to a method of producing two tilt domains within a liquid crystal layer and a method of fabricating a liquid crystal display device using a liquid crystal layer having the two tilt domains and a liquid crystal display device using the same.

DESCRIPTION OF THE RELATED ART

Twisted nematic (TN) liquid crystal displays (LCDs) have been mainly used for notebook computers in spite of their narrow viewing angle characteristics. However, improving the viewing angle is a prerequisite for the replacement of cathode ray tube (CRT) displays by LCDs in monitor and TV markets. Therefore, recently, in order to enhance the viewing angle characteristics in the twisted nematic LCDs, various new concepts of LCDs have been suggested. For example, nematic liquid crystals using an in-plane switching (IPS) mode have been reported by R. Kiether, et al. (Proceedings of the 12th Int. Display Res. Conf., Society for Information Display and Institute of Television Engineers of Japan, Hiroshima, p. 547, 1992). A vertical alignment (VA) mode with a negative birefringent compensation film has also been proposed by K. Ohmuro, et al. (Digest of Technical Papers of 1997, Society for Information Display Int. Symposium, Society for Information Display, Boston, p. 845, 1997).

Although the IPS mode shows wide viewing angle characteristics comparable to the CRT display, the cell gap margin is narrower and the response time is rather slower than that of the TN mode. Furthermore, the IPS mode has a slight color shift in oblique viewing angles.

The VA mode with negative birefringent film shows a viewing angle range greater than 70° in polar angle for all azimuthal directions and a very fast response time of less than 25 ms. However, so as to obtain the wide viewing angles, fabrication of a dual domain or a multi-domain is further necessary. A technology of fabricating the dual domain or the multi-domain within the liquid crystal layer is described by K. Ohmuro, et al. (Society for Information Display, p. 845, 1997). Here, various technologies of forming the liquid crystal having dual domain or multi-domain structure so as to obtain such wide viewing angle were proposed. They include (1) a multiple rubbing method, (2) a multiple alignment layer method, (3) an edge fringe field method, and (4) a parallel fringe field method. The multiple rubbing method, the multiple alignment layer method and parallel fringe field method have been demonstrated on the gray scale VGA level. However, these methods require cumbersome processing. For example, each panel requires more than one rubbing for one or both substrates when the multiple rubbing method is used. Each panel requires one alignment layer patterning and etching for one or both substrates when the multiple alignment layer method is used. The indium tin oxide (ITO) layer on top of the color filter layer needs to be patterned when the parallel fringe field method is used. The process of these three methods involves coating, baking, patterning, developing and stripping of the photoresist as well as one additional rubbing and photolithography process (for the multiple rubbing method), or one additional layer coating (for the multiple alignment layer method) or ITO etching on the color filter side (for the parallel fringe field method).

Therefore, the process becomes significantly more complicated and more expensive than that of the conventional single-domain process. Moreover, the multiple rubbing method involves dissymmetry in the viewing angle.

In the liquid crystal display device of in-plane switching mode (refer to "Asia Display Proceedings of the 15th International Display Research Conference" Society for Information Display and the Institute of Television Engineers of Japan, Hamamatsu, Japan, p. 577, 1995) proposed so as to solve a narrow viewing angle of TN mode, liquid crystal molecules are first arranged in parallel with the substrates in the absence of the electric field and then twisted in the shape of the electric field. Therefore, it is known that the response time using the conventional IPS mode is not enough for displaying a fast moving image, in particular, in the gray scale operation. Therefore, it is important to improve the response time for high-performance LCDs.

Further, since liquid crystal molecules used in a liquid crystal display device using an in-plane switching mode has optical anisotropy, the picture shows a different color depending on the viewing direction. This is referred to as a color shift phenomenon. Such a color shift phenomenon decreases the display characteristic of the liquid crystal display device (refer to Euro display '96, "Complete suppression of color shift in in-plane switching mode LCDs with a multi-domain structure obtained by unidirectional rubbing method").

SUMMARY OF THE INVENTION

Accordingly, one object of this invention is to simplify the technology for producing at least two tilt domains within a liquid crystal layer.

Another object of this invention is to provide a method of forming a liquid crystal display device, utilizing such simplified technology for producing at least two tilt domains within a liquid crystal layer.

A further object of this invention is to improve viewing angle characteristics in a liquid crystal display.

Another object of this invention is to shorten the response time in a liquid crystal display.

According to a broad aspect of the invention, so as to produce two domains within a liquid crystal layer, first, two electrodes are formed on a substrate, and a liquid crystal layer aligned vertically with respect to the substrate are then formed on the substrate where the substrate has two electrodes separated from each other by a selected distance. Finally, an electric field between the two electrodes is applied.

According to one aspect of the invention, a method for fabricating a liquid crystal display device, comprises the steps of: providing a first substrate; forming a first electrode and a second electrode on a surface of the first substrate; forming a homeotropic alignment layer on the first substrate having the two electrodes thereon; providing a second substrate; forming a homeotropic alignment layer on a surface of the second substrate; arranging the two substrates such that the homeotropic layers on the two substrates face each other and are separated by a selected distance; and forming a liquid crystal layer within a space between the two substrates.

According to another aspect of the invention, a method for fabricating a liquid crystal display device, comprises the steps of: providing a first substrate having an inner surface and an outer surface opposite the inner surface; forming a first electrode and a second electrode on the inner surface of the first substrate; forming a first homeotropic alignment layer on the inner surface of the first substrate having the two electrodes; providing a second substrate having an inner surface and an outer surface opposite the inner surface; forming a second homeotropic alignment layer on the inner surface of the second substrate; arranging the two substrates such that the two inner surfaces of the two substrates face each other separated by a selected distance; forming a liquid crystal layer within a space between the two substrates; and forming an optical compensating plate on at least one outer surface of the two substrates.

According to a further aspect of the invention, a liquid crystal display device comprises: a substrate having a surface; a first electrode formed on the surface of the substrate; a second electrode formed on the same surface of the substrate, an electric field being generated between the first electrode and the second electrode; a liquid crystal layer formed on the substrate surface and including liquid crystal molecules, the liquid crystal molecules being aligned vertically with respect to the substrate surface in an absence of the electric field between the electrodes.

According to still another aspect of the invention, a liquid crystal display device comprising: a substrate; a first electrode formed on a surface of the substrate; a second electrode formed on the substrate surface, an electric field being generated between the two electrodes; a liquid crystal layer formed on the substrate surface and including liquid crystal molecules, the liquid crystal molecules being aligned vertically with respect to the substrate surface in an absence of the electric field between the two electrodes; and a homeotropic alignment layer formed on at least one of upper and lower surfaces of liquid crystal layer.

According to even another aspect of the invention, a liquid crystal display device comprises: a substrate; a first electrode formed on a surface of the substrate; a second electrode formed on the substrate surface, an electric field being generated between the two electrodes; a liquid crystal layer formed on the substrate surface and including liquid crystal molecules; a homeotropic alignment layer formed on at least one of upper and lower surfaces of liquid crystal layer; and an optical compensating plate formed on at least one of upper and lower portions of the liquid crystal layer, whereby the liquid crystal molecules are aligned vertically with respect to the substrate surface in an absence of the electric field between the two electrodes.

According to yet another aspect of the invention, a liquid crystal display device comprising: a first substrate having an inner surface and an outer surface opposite the inner surface; a second substrate disposed opposite the first substrate and having an inner surface and an outer surface opposite the inner surface; a liquid crystal layer sandwiched between the inner surfaces of the two substrates and including liquid crystal molecules; a first electrode and a second electrode formed on the inner surface of the first substrate, wherein the first electrode and the second electrode are spaced apart for application of an electric field therebetween; homeotropic alignment layers respectively formed on the inner surface of the first substrate and on the inner surface of the second substrate;and an optical compensating plate disposed on at least one of the outer surfaces of the first and second substrates, wherein in the presence of the electric field between the two electrodes, the molecules are tilted from the respective electrodes towards a central region between the two electrodes.

According to even an additional aspect of the invention, a liquid crystal display device, comprises: a lower or first substrate having an inner surface and an outer surface opposite the inner surface; an upper or second substrate having an inner surface and an outer surface opposite the inner surface and disposed opposite the first substrate; a liquid crystal layer sandwiched between the two substrates and including liquid crystal molecules; a pixel electrode and a counter electrode formed on the inner surface of the first substrate, an electric field for driving the liquid crystal molecules being generated between the two electrodes; homeotropic alignment layers respectively formed on the inner surface of the lower substrate and on the inner surface of the upper substrate; a polarizer disposed outside the lower substrate; an analyzer disposed outside the upper substrate; and an optical compensating plate disposed at least one of between the liquid crystal layer and the polarizer and between the liquid crystal layer and the analyzer, whereby in an absence of the electric field between the two electrodes, the liquid crystal molecules are aligned vertically with respect to the substrate surface, and in a presence of the electric field between the two electrodes, the molecules are tilted rightward and leftward towards the center between the two electrodes.

According to still another aspect of the invention, a liquid crystal display device comprises: a lower or first substrate having an inner surface and an outer surface opposite the inner surface; an upper or second substrate having an inner surface and an outer surface opposite the inner surface and disposed opposite the first substrate; a plurality of gate bus lines and a plurality of data bus lines intersecting the plurality of gate bus lines, arranged in a matrix configuration on a surface of the first substrate and defining a plurality of pixel regions each bounded by a pair of the plurality of gate bus lines and a pair of the plurality of data bus lines; a liquid crystal layer sandwiched between the inner surfaces of the two substrates and including liquid crystal molecules; a pixel electrode and a counter electrode formed on the inner surface of the first substrate, an electric field for driving the liquid crystal molecules being generated between the two electrodes; a plurality of switching devices corresponding respectively to the plurality of pixel regions, each of the plurality of switching devices being connected to a corresponding one of the plurality of data bus lines and a corresponding one of the plurality of pixel electrodes; homeotropic alignment layers respectively formed on the inner surface of the second substrate and on the inner surface of the first substrate; a polarizer disposed outside the first substrate; an analyzer disposed outside the second substrate; and an optical compensating plate interposed at least one of between the liquid crystal layer and the polarizer and between the liquid crystal layer and the analyzer, whereby in a presence of the electric field between the pixel electrode and the counter electrode, the molecules are tilted rightward and leftward towards the center between the two electrodes.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinafter, preferred embodiments of this invention will be explained in detail with reference to the accompanying drawings.

Figure 1A:
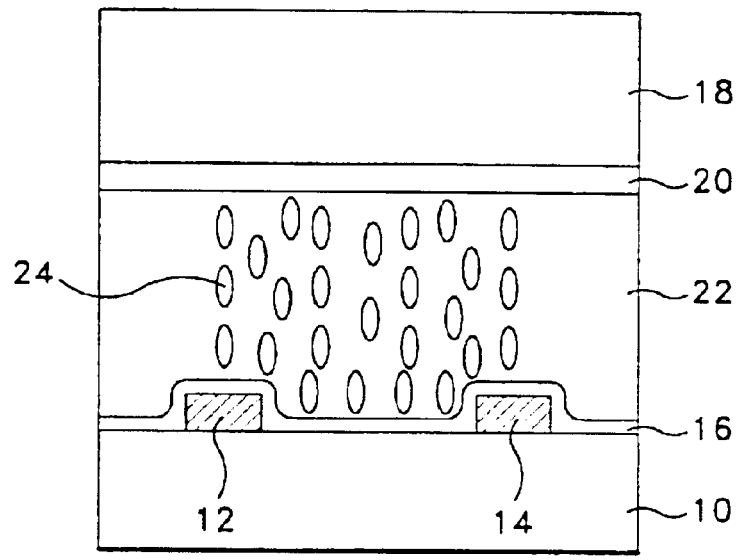
FIG. 1A is a cross sectional view showing a liquid crystal device before an electric field is applied according to the first embodiment of this invention.

Embodiment 1
Formation of Liquid Crystal Layer Having a Dualdomain Structure Referring to FIG. 1A, a first electrode 12 and a second electrode 14 for generating an electric field therebetween are formed on a lower or first glass substrate 10. The electrodes 12 and 14 are of a conductive material. They preferably are optically transparent and may be formed of conventional materials, as is well known in the art. The electrodes may be applied by vacuum deposition, printing, or any other applicable technique that provides the desired optical and electrical characteristics. Exemplary electrode materials include indium tin oxide, tin oxide and antimony doped tin oxide. The electrodes are relatively thin, for example, about 200 angstroms thick and are adequately transparent so that they preferably do not significantly affect the optics of the liquid crystal display. The distance between the electrodes 12 and 14 may be almost the same as a width of the respective electrodes and may be a little larger than that of the electrodes. The distance therebetween is for example 3 to 20 $\mu$m. It is preferable to be about 4 to 5 $\mu$m. The electrodes may have an interdigital shape. The first electrode and second electrode are simultaneously formed. Alternatively, any one of the electrodes 12 and 14 is first formed and the remaining one is formed later. Also, so as to prevent a distortion of disclination lines (See FIG. 11B and FIG. 13) it is preferable to form the electrodes 12 and 14 in a single layer. It is also preferable to remove the cause of any distortion of the disclination lines by optimizing the design of the edge portions of the electrode. Here, the first electrode 12 and the second electrode 14 are electrically insulated from each other.

A lower or first alignment layer 16 of polyimide (JALS-204 manufactured by Japan Synthetic Rubber Co.) is coated on a resultant structure of the first substrate 10 having the formed electrodes 12 and 14. The first alignment layer 16 is an alignment layer subject to homeotropical alignment treatment in a known technique. On an upper or second substrate 18 is also formed a corresponding upper or second homeotropic alignment layer 20 of polyimide (JALS-204 manufactured by Japan Synthetic Rubber Co.). The alignment layers 16 and 20 each has a pretilt angle in a range of about 88 degrees to about 92 degrees. By pretilt angle is meant an angle between the longer axes of the liquid crystal molecules and the surfaces of the substrates.

The lower or first substrate 10 and the upper or second substrate 18 are disposed such that they are opposite to each other. A nematic liquid crystal compound for forming a liquid crystal layer 22 is poured between the first and second substrates 10 and 18 which are then sealed. The liquid crystal molecules 24 of liquid crystal layer 22 have a property of positive dielectric anisotropy and they may be selected to have excellent purity and reliability.

The property of positive or negative dielectric anisotropy has the following meaning:

dielectric anisotropy$(\Delta\epsilon)=\epsilon-\epsilon\perp$ $\epsilon$: dielectric constant where the electric field is applied parallel to a direction of an longer axis of the molecule $\epsilon\perp$: dielectric constant where the electric field is applied normal to a direction of an longer axis of the molecule.

When the dielectric constant anisotropy is positive, the longer axis of the liquid crystal molecule is arranged parallel to a direction of the electric field. When the dielectric constant anistropy is negative, the shorter axis of the liquid crystal molecule is arranged parallel to the direction of the electric field.

The liquid crystal layer 22 has a birefringence index ($\Delta$n) of about 0.065 to about 0.070. Thus, $\Delta$nd is set to be about 0.2 to 0.6 $\mu$m. The homeotropic alignment layers 16 and 20 induce the liquid crystal molecules 24 so that the major axes of the liquid crystal molecules 24 are aligned substantially vertically relative to the substrate surface in the absence of an electric field between the electrodes 12 and 14.

Figure 1B:
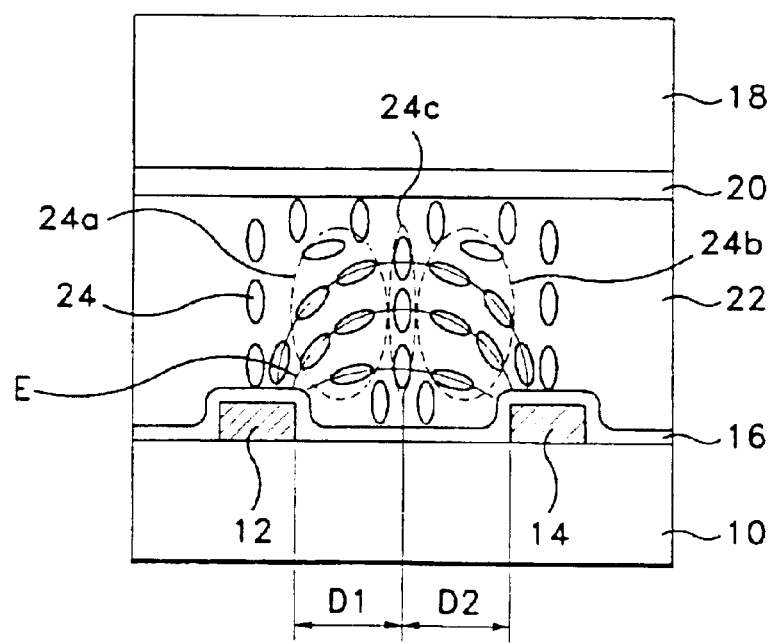
FIG. 1B is a cross sectional view showing a liquid crystal device after the electric field is applied according to the first embodiment of this invention.

The principle of forming the liquid crystal layer having multi-domain structure is as follows:

When an electric field is not applied to the liquid crystal layer, the liquid crystal molecules 24 within the liquid crystal layer 22 are aligned vertically with respect to the surfaces of the second and first substrates 18 and 10. In contrast with this, when an electric field is applied to the liquid crystal layer, i.e., when a voltage V>Vth is applied, there is formed a fringe field between the first electrode and the second electrode. Accordingly, depending on the direction of the electric field, the liquid crystal molecules of the liquid crystal layer are divided into two domains D1, D2 at a region defined by the first and second electrodes, as shown in FIG. 1B.

For instance, the liquid crystal molecules 24a in a first domain are aligned by rotating in the clockwise direction whereas the liquid crystal molecules 24b in a second domain are aligned by rotating in the counterclockwise direction. At this time, the liquid crystal molecules at a boundary between the two domains are aligned vertically with respect to the respective surfaces of the second and first substrates. However, the molecules 24c existing in a border area between the two domains D1 and D2 still hold an original state where the major axes of the liquid crystal molecules are aligned substantially vertically relative to the substrate surfaces because of an influence of the adjacent molecules 24a and 24b to the molecules 24c. The border is important since it serves to border the two domains exactly. The borderline separates and exists so along the line between the domains. In importance of the electric field, the molecules 24c hold the initial state since they receive the force lines with similar dimensions in both directions from the molecules within both domains. In addition, in the molecules 24c within the border region, the inclination of the longer axis of the molecules and the direction of the electrical field is 90 degrees; therefore, the molecules are influenced by a dielectric torque in such a way as to maintain the initial state.

Accordingly, unlike the prior art, this embodiment makes it possible to form liquid crystal layer having a dual domain structure by adopting a simple process instead of the complicated treatments using a plurality of processes.

Embodiment 2
Formation of Liquid Crystal Display Device

Figure 2:
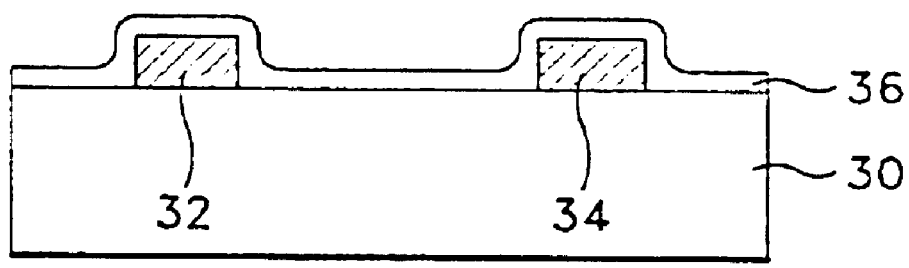
FIG. 2 is a cross sectional view of a first substrate of the liquid crystal display device according to a second embodiment of this invention.

Referring to FIG. 2, the pixel electrode 32 and the counter electrode 34 for generating an electric field therebetween are both formed on the first or base substrate 30. The distance between the electrodes 32 and 34 may be almost the same as a width of the respective electrodes and may be a little larger than that of the electrodes. The distance therebetween is for example 3 to 20 $\mu$m. It is preferable to be about 4 to 5 $\mu$m. At this time, the two electrodes 32 and 34 may be either concurrently or separately formed.

By the word "separately" is meant that any one of the two electrodes 32 and 34 is first formed and the other is thereafter formed. Herein, the pixel electrode 32 and the counter electrode 34 are formed such that they are insulated from each other. In the present embodiment, on the surface of the resultant first substrate 30 where the pixel and counter electrodes 32 and 34 are formed, is coated an homeotropic alignment layer 36 of polyimide JALS-204 manufactured by Japan Synthetic Rubber.

The lower alignment layer 36 is an alignment layer already subject to a homeotropical alignment treatment in a known technique. The alignment layer 36 has pretilt angle in a range of about 88 degrees to about 92 degrees. The resultant structure is then cleaned by deionized water.

Figure 3:
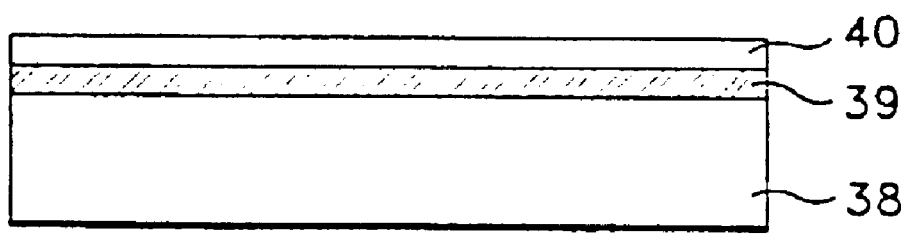
FIG. 3 is a cross sectional view of a second substrate of the liquid crystal display device according to the second embodiment of this invention.

Referring to FIG. 3, on the inner surface of an upper or second substrate 38, is formed a color filter 39 with a black matrix (not shown) by a conventional method. The second substrate 38 does not have any counter electrode made of indium tin oxide. On the second substrate 38 having the color filter formed thereon is coated a homeotropic alignment layer 40 of polyimide JALS-204 manufactured by Japan Synthetic Rubber Co. The alignment layer 40 also has pretilt angle in a range of about 88 degrees to about 92 degrees. The resultant structure is then cleaned by deionized water.

Figure 4A:
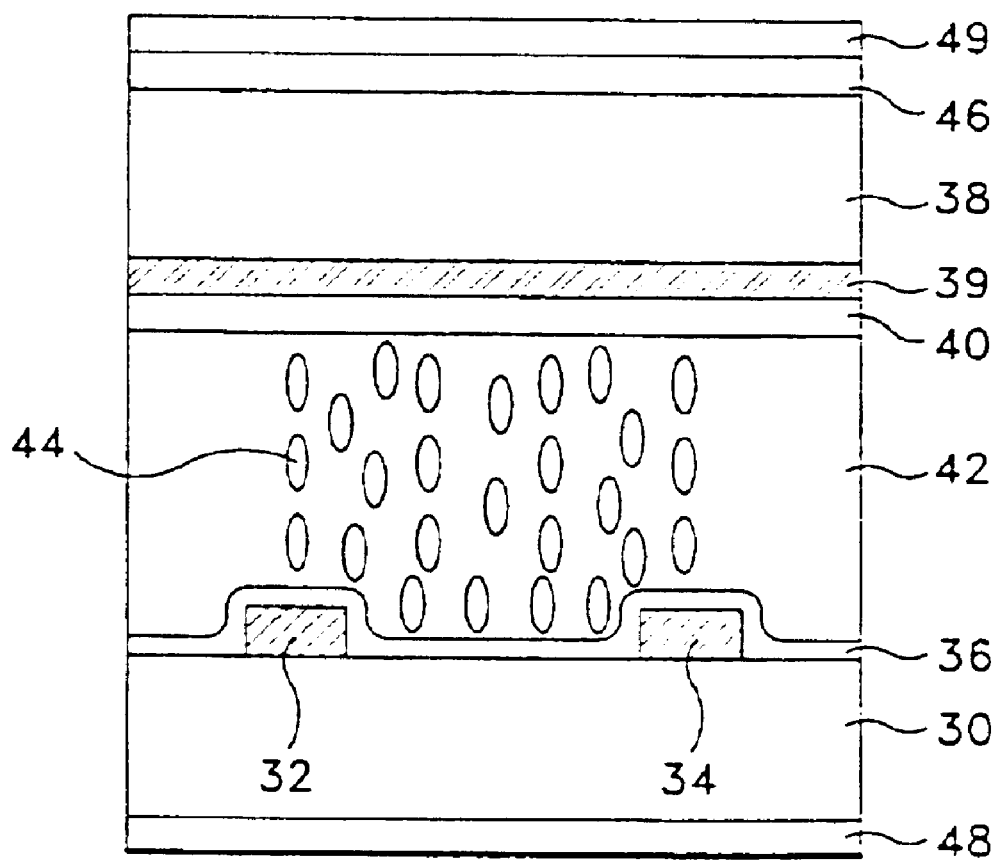
FIG. 4A is a cross sectional view of the liquid crystal display device in the absence of an electric field according to the second embodiment of this invention.
Figure 4A:
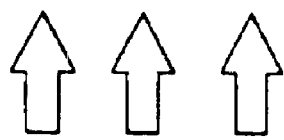

Referring to FIG. 4A, the second glass substrate 38 on which the color filter 39 and the homeotropic alignment layer 40 are both formed, and the first substrate are assembled to give a cell gap(d) of about 3.0 $\mu$m to about 8.5 $\mu$m between the alignment layers 36, 40. Thereafter, a nematic liquid crystal is inserted into the space to provide a liquid crystal layer 42. The liquid crystal layer 42 has a birefringent index($\Delta$n) of about 0.065 to about 0.070. Thus, And is set to be about 0.2 to 0.6 $\mu$m. Herein, the liquid crystal molecules 44 of the liquid crystal layer 42 have positive dielectric anisotropy. As a result, the homeotropic alignment layers 36 and 40 induce the liquid crystal molecules 44 so that the major axes of the liquid crystal molecules 44 are aligned substantially perpendicularly to the substrate surface in the absence of an electric field between the electrodes 32 and 34. The resultant structure is referred to below as an LCD panel.

As shown in FIG. 4A, an optical compensating plate 46 is attached to the LCD panel on the outer surface of the second substrate 38. A polarizer 48 is attached to the LCD panel on the surface of the first substrate 30 and the analyzer 49 is attached to the LCD panel on the exposed surface of the optical compensating plate 46. The optical compensating plate 46 may be disposed on either side of an LCD panel with the polarizer 48 and the analyzer 49 sandwiching the compensating plate 46 and the LCD panel therebetween. That is, although the optical compensating plate 46 is interposed between the second substrate 38 and the analyzer 49 in FIG. 4A, the optical compensating plate may be disposed between the first substrate 30 and the polarizer 48 and may be disposed on both sides of the LCD panel. More broadly, the compensating plate can be viewed as being formed on at least one of upper and lower portions of the liquid crystal layer or if not directly thereon, on at least one side of the upper and lower portions of the liquid crystal layer, i.e., with some other layer or substrate in between.

Next, an operation principle in which the liquid crystal layer varies from a single domain structure to a dual domain structure will be described.

In the absence of an applied electric field, the liquid crystal molecules are vertically aligned with respect to the surface of the both substrates.

Figure 4B:
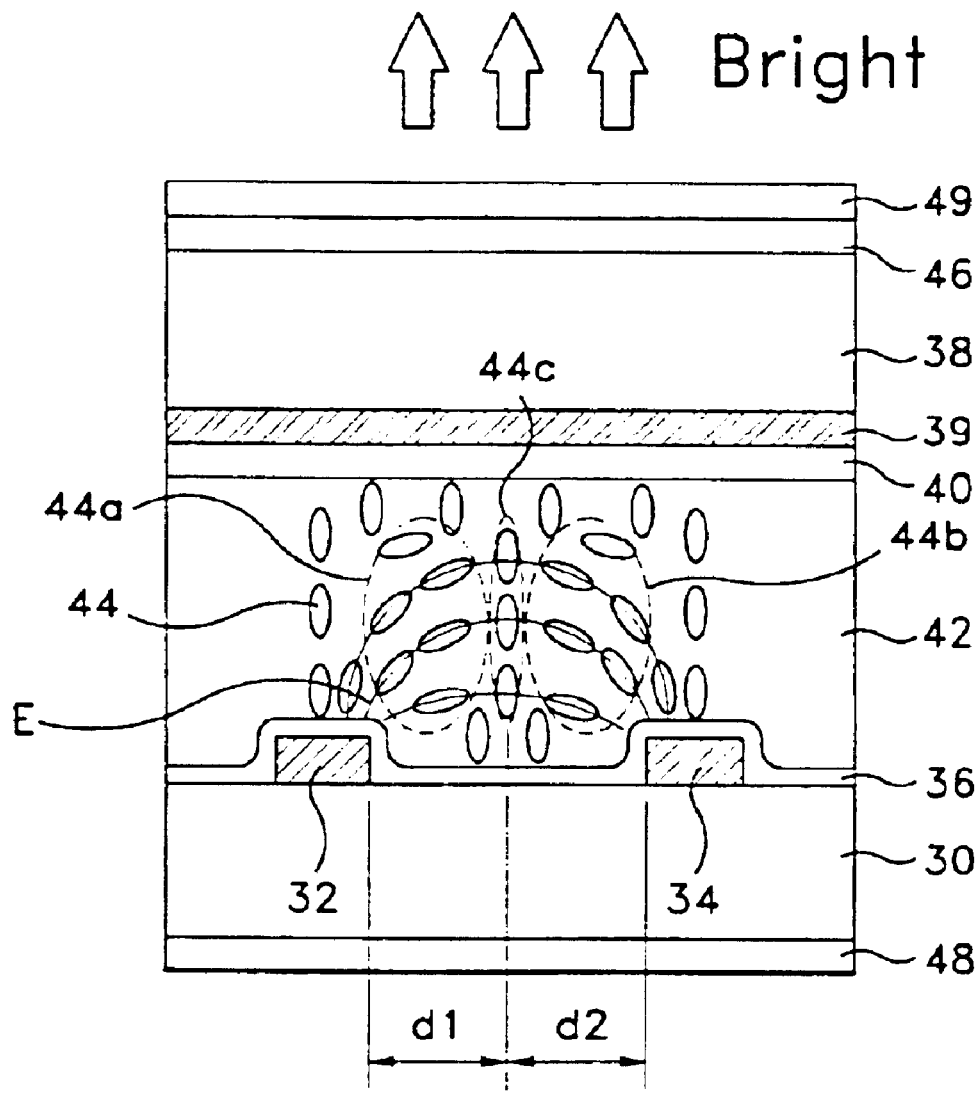
FIG. 4B is a cross sectional view of the liquid crystal display device in the presence of an electric field according to the second embodiment of this invention.

Upon application of an electric field, a fringe field having a vertical component which has a symmetrical shape based on a border is formed between both electrodes. As a result, as shown in FIG. 4B, the liquid crystal molecules within the liquid crystal layer 42 in a unit pixel begin to align. For example, the liquid crystal molecules 44a in a first domain region d1 are aligned in a clockwise direction while the liquid crystal molecules 44b in a second domain region d2 are aligned in a counterclockwise direction. The molecules 44c existing at a border area between the two domains d1 and d2 continue to hold an original state where the major axes of the liquid crystal molecules are aligned substantially vertically relative to the substrate surface because of an influence of the adjacent molecules 44a and 44b to the molecules 44c. Therefore, the molecules 44 are aligned in a symmetrical configuration based on a border between the electrodes 32 and 34.

According to the present embodiment, several times of rubbing and photolithography processes for forming the dual domain structure can be deleted. As a result, the invention can facilitate a formation of the dual domain structure within the liquid crystal layer in respective unit pixels.

Embodiment 3
Structure of Liquid Crystal Display Device

Figure 5A:
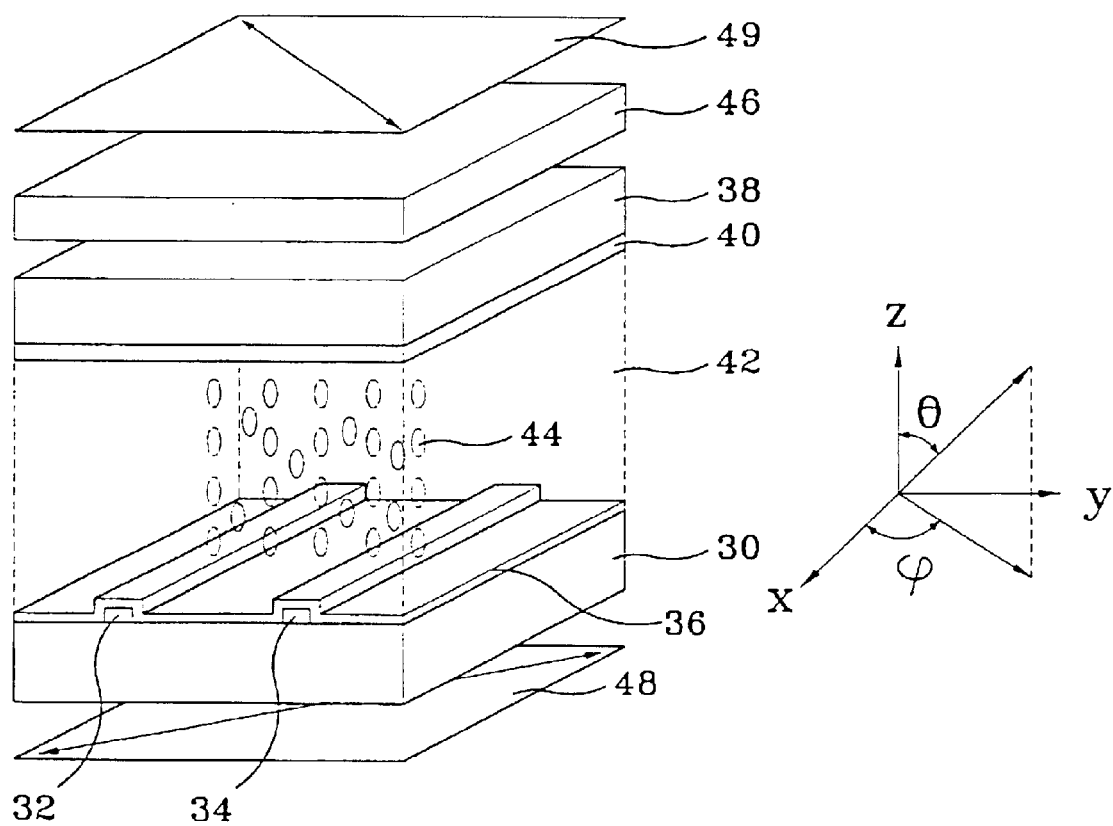
FIG. 5A is a perspective view showing the liquid crystal display device in the absence of an electric field according to a third embodiment of this invention.

Referring to FIG. 5A, a first substrate 30 and a second substrate 38 are disposed opposite to each other with a cell gap (d) of about 3.0 μm to about 8.5 μm. Here, the first substrate 30 is a lower substrate and the second substrate 38 is an upper substrate. The substrates 30 and 38 are made of a transparent glass material. At this time, the cell gap is determined by considering a response time, a driving voltage and a transmittance of the liquid crystal display device, etc. The cell gap is preferably set such that $\Delta nd \equiv \lambda/2$ is about 0.2 to 0.6 μm. In general, as $\Delta nd$ increases, the transmittance increases while a viewing angle becomes narrow. As the cell gap (d) increases, the driving voltage decreases while the response time becomes long. The optical compensating plate will be described later.

A liquid crystal layer 42 is interposed between the first substrate 30 and the second substrate 38. The liquid crystal layer 42 comprises a nematic liquid crystal, which exhibits a positive dielectric anisotropy. Due to a characteristic that the liquid crystals show a bending configuration upon the application of the electric field, it is preferable to use the liquid crystals having a low elastic coefficient, thereby lowering the driving voltage.

Since liquid crystals of positive dielectric anisotropy have good purity and reliability, they are used in this embodiment.

An additive may be used in the liquid crystal to expedite return to an original alignment. An exemplary additive, namely a cholesteric chiral additive may be used in solution with the liquid crystal material.

So as to generate an electric field which drives the liquid crystals in the IPS mode, a pixel electrode 32 and a counter electrode 34 are formed on either one of the first substrate 30 and the second substrate 38. The other of the substrates has no electrode thereon.

The pixel electrode 32 and the counter electrode 34 are electrically isolated from each other. In this embodiment, the pixel electrode 32 and the counter electrode 34 both are formed on the inner surface of the first substrate 30. Here, the pixel electrode 32 and the counter electrode 34 are arranged such that they are separated from each other with a selected distance. The distance between the pixel electrode 32 and the counter electrode 34 may be almost the same as a respective width of the electrodes 32 and 34 and may be a little larger than that of the respective electrodes 32 and 34. The distance therebetween is for example 3 to 20 μm. It is preferable to be about 4 to 5 μm. Here, various types and shapes of electrodes 32 and 34 can be adopted within the scope of this invention.

For example, the electrodes 32 and 34 may have an interdigital configuration with an electrode distance of about 20 μm and an electrode width of about 10 μm.

The pixel electrode 32 and the counter electrode 34 are made of opaque material having an excellent conductance such as chromium and aluminum. The electrodes 32 and 34 may be made of transparent metal material such as indium tin oxide.

Here, a data bus line signal is inputted to the pixel electrode 32 and a common signal is inputted to the counter electrode 34.

Though not shown in the drawings, on the inner surface of the substrate 30 having the pixel electrode 32 and the counter electrode 34, are formed a plurality of gate bus lines and a plurality of data bus lines with a matrix configuration and a plurality of switching devices. On the inner surface of the substrate 38 having no electrode are formed a plurality of color filters (not shown).

In this embodiment, the alignment layers are provided in order to put the liquid crystal molecules in an initial orientation direction.

The homeotropic alignment layers 36 and 40 respectively are formed on the inner surfaces of the first substrate 30 and the second substrate 38 by coating homeotropic alignment material thereon where the first substrate 30 has the pixel electrode 32 and the counter electrode 34.

The pretilt angles of the upper and lower alignment layers 36 and 40 are about 88 degrees to about 92 degrees relative to the substrates.

The homeotropic alignment layers 36 and 40 induce the tilt alignment capable of arranging the longer axes of the liquid crystal molecules in a substantially perpendicular direction to the substrates. As a result, the pretilt angle developed by the homeotropic alignment layers are shown to be about 90 degrees relative to the substrates 30 and 38, as represented by the orientations of the liquid crystal molecules 44.

A polarizer 48 is disposed on the outer surface of the first substrate 30 such that an angle between the polarizing axis thereof and a direction of the electric field between the electrodes 32 and 34 is about 40 degrees to 50 degrees, preferably about 45 degrees.

Here, the reason that the angle between the polarizing axis thereof and the direction of the electric field should be about 45 degrees is as follows:

In the IPS mode, the transmittance of light is determined by the following equation (1):

$$T = T \sin^2(2\chi)\sin^2(\pi \cdot \Delta nd/\lambda) \qquad \text{equation (1)}$$

Here, $\chi$ is an angle between the optical axis of liquid crystal molecules and the polarizing axis of a polarizer. $\Delta n$ is the anisotropy of the refractive index, d is an effective cell gap (thickness of a LC layer) and $\lambda$ is the wavelength of the incident light.

Therefore, so as to obtain a maximum transmittance of the light, the angle between the optical axis of liquid crystal molecules and the polarizing axis of a polarizer should be 45 degrees.

An analyzer 49 is disposed outside the second substrate 38 where an axis of the analyzer 49 is crossed to that of the polarizer 48.

In this embodiment, so as to greatly enhance the contrast, an optical compensating means having approximately the same retardation as that of the TN liquid crystal is used.

Figure 5B:
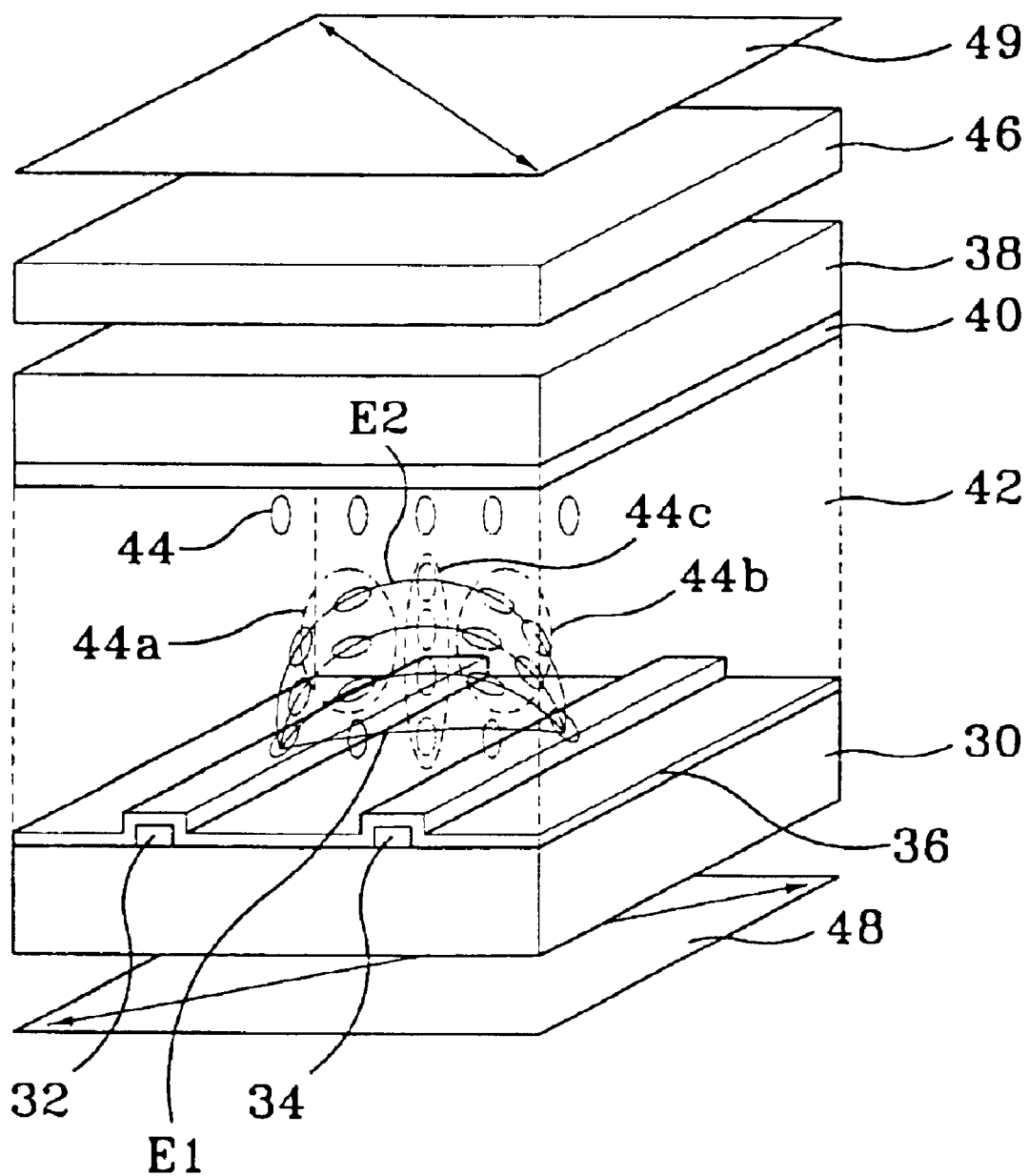
FIG. 5B is a perspective view showing the drive of the liquid crystal molecules in the presence of an electric field according to the third embodiment of this invention.

Although an optical compensating plate 46 is disposed between the second substrate 38 and the analyzer 49 in FIGS. 5A and 5B, the optical compensating plate 46 may be disposed on either one side of the LCD panel with the polarizer 48 and the analyzer 49 sandwiching the compensating plate 46 and the LCD panel therebetween. That is, the optical compensating plate may be disposed at least one of between the liquid crystal layer and the polarizer and between the liquid crystal layer and the analyzer.

The optical compensating plate 46 comprises nematic liquid crystal cells having about the same $\Delta nd$ value (where $\Delta n$ represents the birefringence index of the liquid crystal and d is the thickness of the liquid crystal layer) as that of the LCD panel.

Figure 6A:
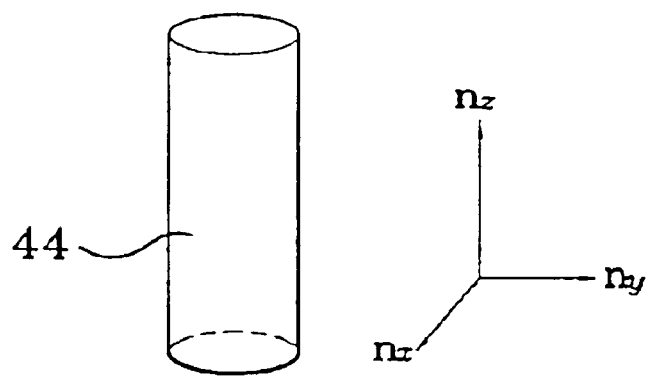
FIG. 6A is a drawing for showing the general shape of one liquid crystal molecule of the liquid crystal layer.

Generally, the liquid crystal layer, as shown in FIG. 6A, comprises a plurality of molecules (44; $n_x = n_y < n_z$) of a rod shape having positive birefringence where the height ($n_z$) of each molecule is larger than the radius ($n_x = n_y$) thereof. Since the liquid crystal molecule 44 has a major axis and a minor axis, as described above, it exhibits an anisotropic refractive index characteristic.

As a result, for example, in a case that the molecules 44 of the liquid crystal layer are arranged normal to the substrates, when a viewer looks at the screen at a front position with a viewing angle being normal to the screen, since the light which has pass the polarizer 48 pass the optical axis of the liquid crystal molecules 44 and thereby does not change the polarization characteristic, the screen becomes dark. On the other hand, if the viewer looks at the screen at a front position with a viewing angle being at a direction away from the polarization axis, since an oblique axis of the liquid crystal molecules is seen, a light leakage occurs. As a result, such a light leakage deteriorates the contrast of the liquid crystal display device.

Figure 6B:
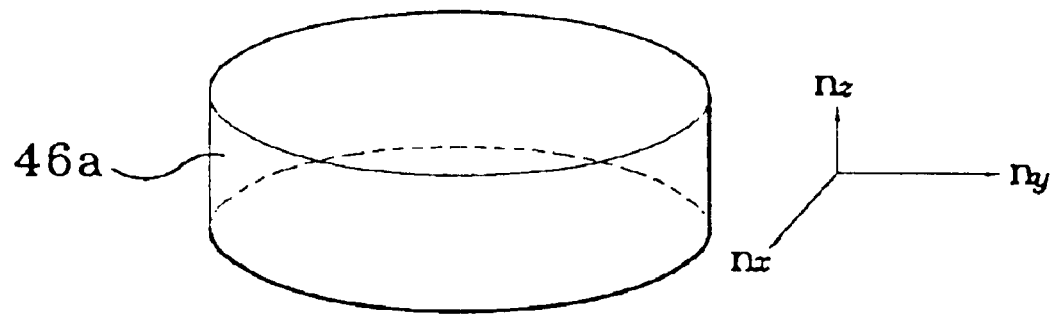
FIG. 6B is a drawing for showing one liquid crystal molecule included in an optical compensating plate according to a third embodiment of this invention.

Therefore, in this embodiment, so as to improve the contrast, the optical compensating plate 46 is used. The optical compensating plate 46 is a cured liquid crystal film comprising a plurality of molecules 46a having negative birefringence, as shown in FIG. 6B. Each liquid crystal molecule 46a ($n_x=n_y>n_z$) has the radius $n_x$ or $n_y$ thereof longer than the height $n_z$ thereof. Each molecule 46a has a disk type structure or a bi-directionally stretched structure.

Therefore, the optical compensating plate 46 compensates for the anisotropic refractive index of the LCD panel and thereby the LCD panel can exhibit an apparent isotropic characteristics.

The operation of the liquid crystal display device will be explained below.

First, as shown in FIG. 5A, before an electric field between the pixel electrode 32 and the counter electrode 34 is applied, due to the homeotropic alignment layers 36 and 40, the liquid crystal molecules 44 within the liquid crystal layer 42 are arranged with the major axis thereof normal to the surfaces of the substrates.

The light which has passed through the polarizer 48 has linearly polarized characteristics. The linearly polarized light does not change while passing through the liquid crystal layer 42 since the linearly polarized light passes through the optical axes of the liquid crystal molecules 44. Therefore, the light which has been transmitted through the liquid crystal layer 42 can not pass through the analyzer 49 since the axis of the analyzer 49 is crossed to that of the polarizer 48. Therefore, the screen becomes dark. At this time, the optical compensating plate 46 compensates for the anisotropic refractive index of the liquid crystal layer 42 and thereby the screen become completely dark in all viewing angles. Therefore, the contrast may be greatly improved by the addition of the optical compensating means.

Moreover, as shown in FIG. 5B, when a voltage is applied to the pixel electrode 32 and the counter electrode 34, an electric field between the pixel electrode 32 and the counter electrode 34 disposed on the lower substrate 30 is generated.

More specifically, in a portion close to the surface of the first substrate 30, the in-plane electric field (E1) almost parallel to the substrate 30 is generated. In a portion adjacent to the second substrate 38, the electric field (E2) in a shape of ellipse as shown in FIG. 5B is generated.

The liquid crystal molecules close to the first substrate 30 continue to hold a state normal to the substrate 30 due to the van der Waals force between the homeotropic alignment layer 36 and the liquid crystal molecules.

The molecules 44c existing in a midway portion between the pixel electrode 32 and the counter electrode 34 still maintain off-state configuration since they are not influenced by the field.

However, the liquid crystal molecules 44a and 44b except for the liquid crystal molecules close to the first and second substrates and the liquid crystal molecules 44c existing at a center portion between the electrodes 32 and 34 are tilted such that the major axes of the molecules 44a and 44b are parallel with the line of the electric field. More specifically, the liquid crystal molecules 44a at a left side are tilted in a clockwise direction while the liquid crystal molecules 44b at a right side are tilted in a counterclockwise direction. As a result, the liquid crystal layer 42 is divided into two domains d1 and d2 (see FIG. 4B). The liquid crystal molecules included in the same domain are arranged in the same direction, and the direction of orientation is different domain by domain. As a result, the liquid crystal layer 42 is divided into two adjacent domains by an interface therebetween. In this invention, since the dual domain structure of the liquid crystal layer is obtained by the electric field, complete symmetry is obtainable.

The field E1 almost parallel with the surface of the substrate 30 has about 45 degrees relative to the polarizing axis of the polarizer 48. The electric field projected onto the surface of the substrate 30 from the electric field E2 also has about 45 degrees relative to the polarizing axis of the polarizer 48.

As a result, the light which passes through the polarizer 48 and is thereby linearly polarized becomes elliptically polarized within the liquid crystal layer 42 since the polarization state of the linearly polarized light changes within the liquid crystal layer 42. Then, the elliptically polarized light passes through the analyzer 49. As a result, the screen becomes white. Therefore, as appreciated from the equation 1, the transmittance becomes maximum.

Figure 7:
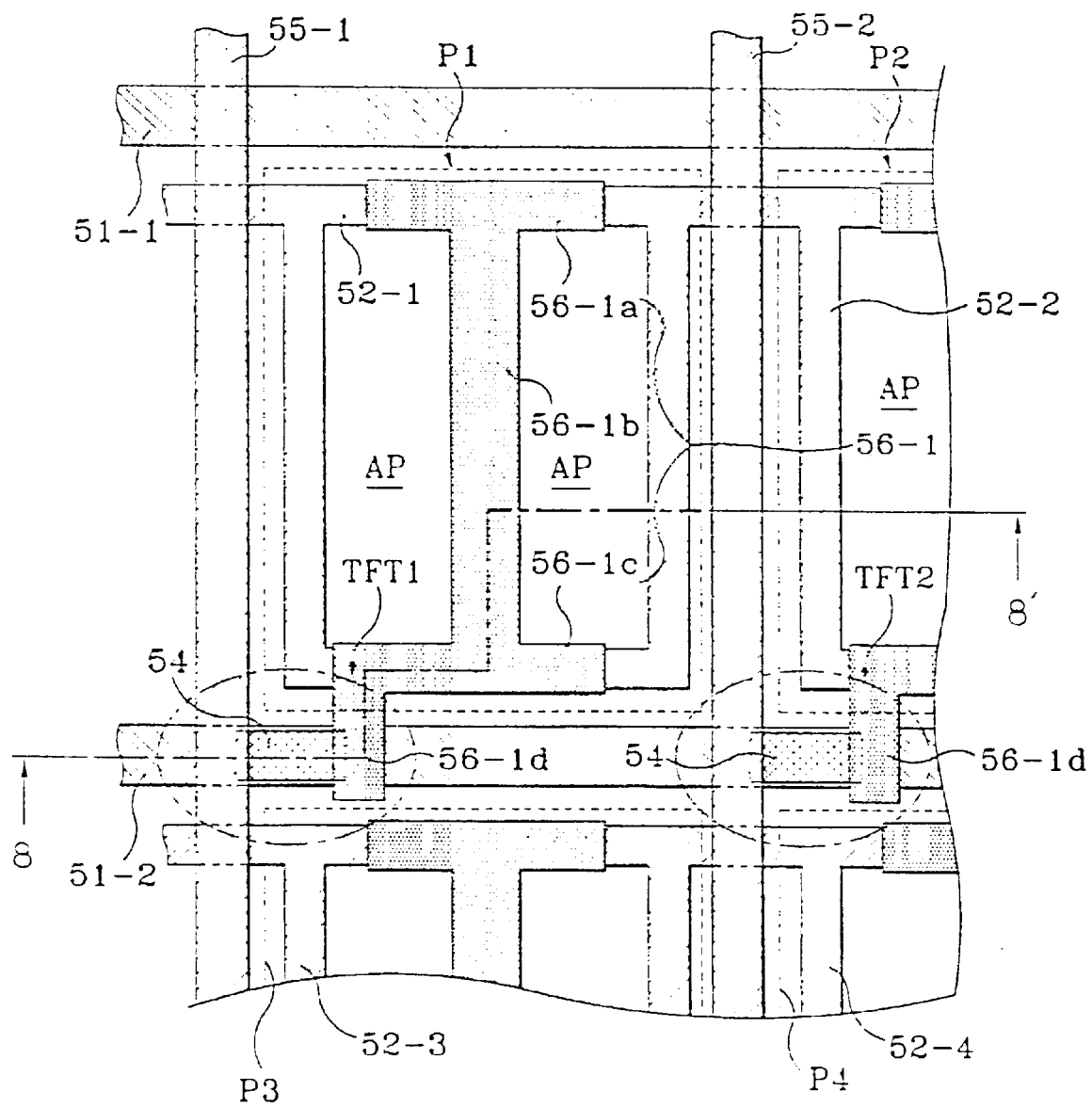
FIG. 7 is a schematic plan view of the first substrate of a liquid crystal display device, according to a fourth embodiment of this invention.

Embodiment 4
Active Matrix Type Liquid Crystal Display Device Having a Multi-Domain Structure in a Liquid Crystal Layer As shown in FIG. 7, in a complete liquid crystal display device, rows of a plurality of gate bus lines 51-1, 51-2 and orthogonal columns of a number of data bus lines 55-1, 55-2 are arranged in a matrix configuration on a transparent lower or first substrate 50. The gate bus lines 51-1, 51-2 and the data bus lines 55-1, 55-2 are electrically insulated from each other by a gate insulation layer (not shown) disposed therebetween. Thus a pixel is formed in the regions bounded by these two kinds of lines. For example, as shown in FIG. 7, a pixel P1 is formed in the region bounded by two kinds of lines 51-1, 51-2 and 55-1, 55-2. In a similar manner, pixels P2, P3, and P4 are formed. Each of the counter electrodes 52-1, 52-2, 52-3, and 52-4 is formed in respective pixel regions P1, P2, P3 and P4 of the first substrate 50, for example in a structure having the form of a squared frame and is electrically connected with the other adjacent counter electrodes within the other adjacent pixels. Therefore, the same common signal is transferred to all counter electrodes 52-1, 52-2, 52-3 and 52-4. Pixel electrode 56-1 is formed in the pixel regions P1 of the first substrate 50 on which the counter electrode 52-1 is formed. Here, the pixel electrode 56-1 may be modified in various configurations. In this embodiment, the pixel electrode 56-1 is formed in a configuration of a letter "I". First flange portion 56-1a and second flange portion 56-1c of the pixel electrode 56-1 are arranged in parallel with each other and are overlapped with the counter electrode 52-1. Web portion 56-1b of the pixel electrodes 56-1 serves to connect first flange portion 56-1a with second flange portion 56-1c and divide the region enclosed by the counter electrode 52-1. In this embodiment, for example, the first flange portion 56-1a and the second flange portion 56-1c are overlapped with portions of counter electrode parallel with the gate bus lines 51-1 and 51-2 and the web portion 56-1b of the pixel electrode 56-1 is arranged between the counter electrode 52-1 and parallel with the data bus lines 55-1 and 55-2. Switching devices, for example thin film transistors TFT1 to TFT2 are each arranged in a corresponding one of intersecting portions of gate bus lines 51-2 and data bus lines 55-1 and 55-2. The thin film transistors TFT1 to TFT2 each includes a channel layer 54, a source electrode 56-1d extended from the pixel electrodes 56-1 and the data bus line 55-1 or 55-2. Here, an aperture region AP of unit pixel of the liquid crystal display device is a space bounded by the counter electrode 52-1 and the pixel electrode 56-1 and an additional capacitance type capacitor is formed in an overlapping portion of the counter electrode 52-1 and the pixel electrode 56-1. A structure of an upper or second substrate is not shown in FIG. 7.

Signal waves having information, for example are applied to the data bus line 55-1 and scanning waves are applied synchronously to the gate bus line 51-2. Here, although shown in drawings, each of gate bus lines 51-1 and 51-2 and each of data bus lines 55-1 and 55-2 are connected to a gate driving IC and a data driving IC LSI, respectively. The information signal is transferred from the data bus line 55-1 to the pixel electrode 56-1 through thin film transistor TFT1. Therefore, an electric field is generated between the counter electrode 52-1 and pixel electrode 56-1.

Figure 8:
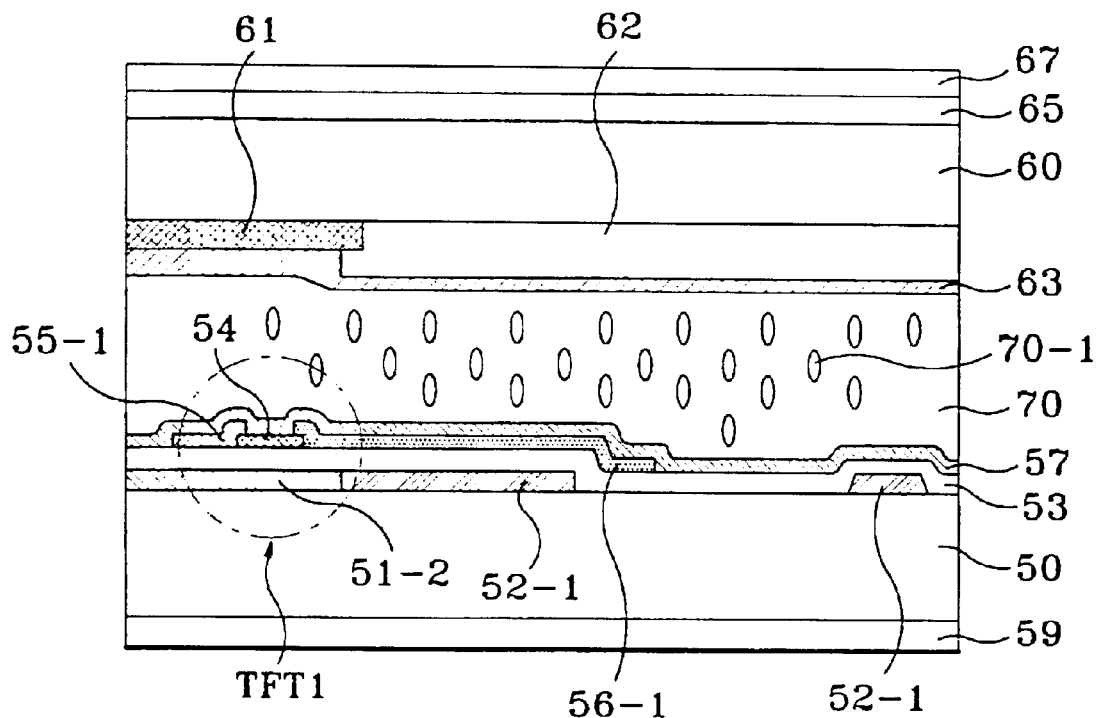
FIG. 8 is a cross sectional view of the liquid crystal display device taken along line 8—8' in FIG. 7, in the absence of an electric field according to the fourth embodiment of this invention.
Figure 9:
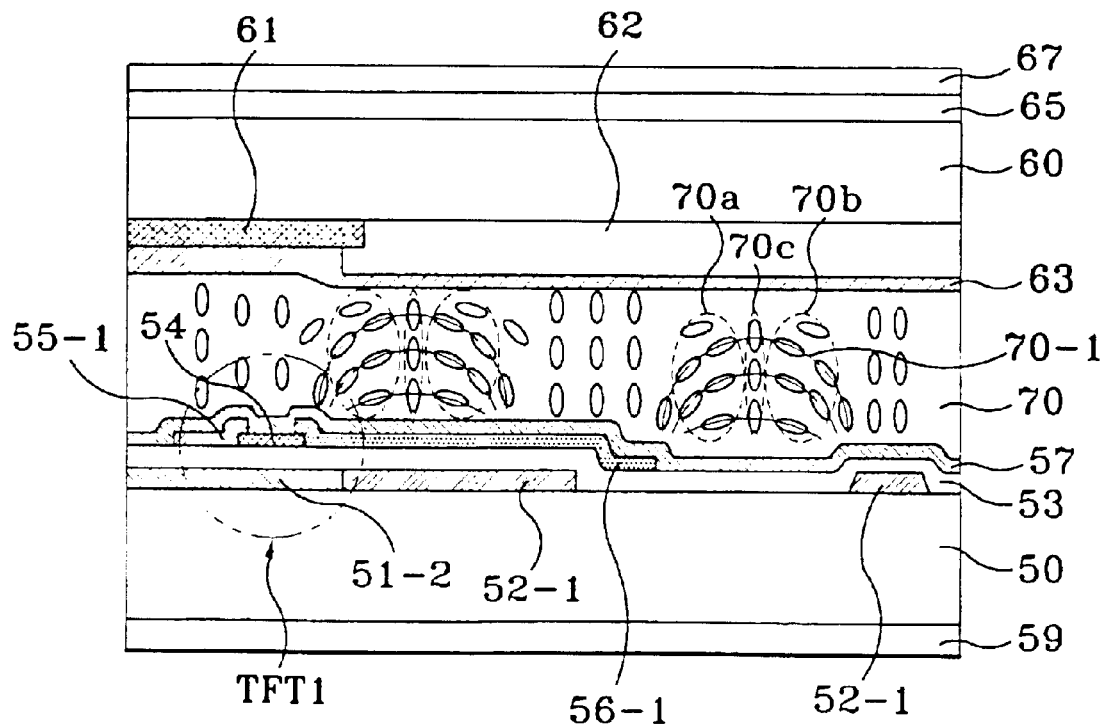
FIG. 9 is a cross sectional view of the liquid crystal display device taken along line 8—8' in FIG. 7, in the presence of an electric field according to the fourth embodiment of this invention.

FIGS. 8 and 9 are cross sectional views of one pixel P1 taken from line 8—8' of FIG. 7 where the gate bus lines (gate electrode 51-2) and counter electrode 52-1 are formed in a surface of the first substrate 50 and the gate insulation layer 53 is formed on a surface of the resultant structure having the gate bus line 51-2 and the counter electrode 52-1 formed thereon. An amorphous silicon layer 57 is deposited on a gate insulation layer 53 overlying the gate bus line 51-2 and patterned to form a chanel layer 54. Data bus line (drain electrode; 55-1) is formed on a surface of the gate insulation layer 53, overlapping one side of the channel layer 54 and the pixel electrode 56-1 is formed on a surface of gate insulation layer 53, overlapping the other side of the channel layer 54. Thus, TFT1 is completely obtained. Here, the gate insulation layer 53 serves to insulate between gate bus line (gate electrode; 51-2) and data bus line (drain electrode; 55-1) and also serves to insulate between the counter electrode 52-1 and the pixel electrode 56-1. Lower homeotropic alignment layer 57 is coated on a resultant structure of the lower or first substrate 50 having thin film transistor formed thereon. A black matrix 61 is formed on an upper or second substrate 60 opposite to the first substrate 50 such that the black matrix 61 faces the thin film transistor TFT1. A color filter 62 is formed at a side of the black matrix 61 on the upper or second substrate 60 such that the color filter 62 faces the pixel region. Upper homeotropic alignment layer 63 is coated on a surface of the second substrate 60 having the black matrix 61 and the color filter 62 formed thereon. Liquid crystal 70 of positive dielectric constant anisotropy is held between the first and second substrates 50 and 60.

In this embodiment like the embodiment 3, as shown in FIG. 8 a polarizer 59 is attached on the outer surface of the first substrate 50. So as to obtain a maximum transmittance of the light, the angle between the optical axis of liquid crystal molecules and the polarizing axis of a polarizer, should be 45 degrees. An analyzer 67 is attached on the outer surface of the second substrate 60. Although not shown in drawing, an axis of the analyzer 67 is crossed to that of the polarizer 59. So as to greatly enhance the contrast, an optical compensating means having approximately the same retardation as that of the nematic liquid crystal is also used like in the embodiment 3. An optical compensating plate 65 is disposed between the second substrate 60 and the analyzer 67. The optical compensating plate 65 may be disposed on either one of the sides of the LCD panel with the polarizer 59 and the analyzer 67 sandwiching the compensating plate 65 and the LCD panel therebetween. Like the third embodiment, the optical compensating plate 65 comprises nematic liquid crystal cells having about the same $\Delta$nd value (where $\Delta$n represents the birefringence index of the liquid crystal and d is the thickness of the liquid crystal layer) as that of the LCD panel.

If no signals are applied to the gate bus line 51-2 and data bus line 55-1, as shown in FIG. 8, liquid crystal molecules 70-1 are aligned such that the optical axes of the liquid crystal molecules 70-1 are vertical to the substrates under the influence of the homeotropic alignment layers 57 and 63.

If signals are applied to the gate bus line 51-1 and the data bus line 55-1, as shown in FIG. 9, an electric field with a vertical gradient is generated between the counter electrode 52-1 and pixel electrode 56-1. Therefore, liquid crystal molecules 70-1 are arranged in the shape of a fringe field, thereby to form dual domains within the liquid crystal layer. At this time, as described in above other embodiments 1 to 3, liquid crystal molecules 70c existing in a central portion between the counter electrode 52 and the pixel electrode 56 still hold a state when the electric field is not applied and liquid crystal molecules 70a and 70b existing at both sides of liquid crystal molecules 70c are tilted into a symmetrical form. Here, various types and shapes of electrodes can be adopted within the scope of the present invention. For example, the counter electrode 52 and the pixel electrode 56 each may be modified in various configurations, for example a comb-shape, ring shape, letters "I", "T", "II" or the like.

Next, so as to measure an electro-optic characteristic, a halogen lamp is used as a light source and a square wave, 60 Hz voltage source from a function generator is applied to the sample liquid crystal cell. The light passed through the cell is detected by a photomultiplier tube. The electro-optical characteristics representing the relationship between the effective voltage applied to the pixels and the brightness (transmitted light intensity) in the present embodiments are shown in FIG. 10.

Figure 10:
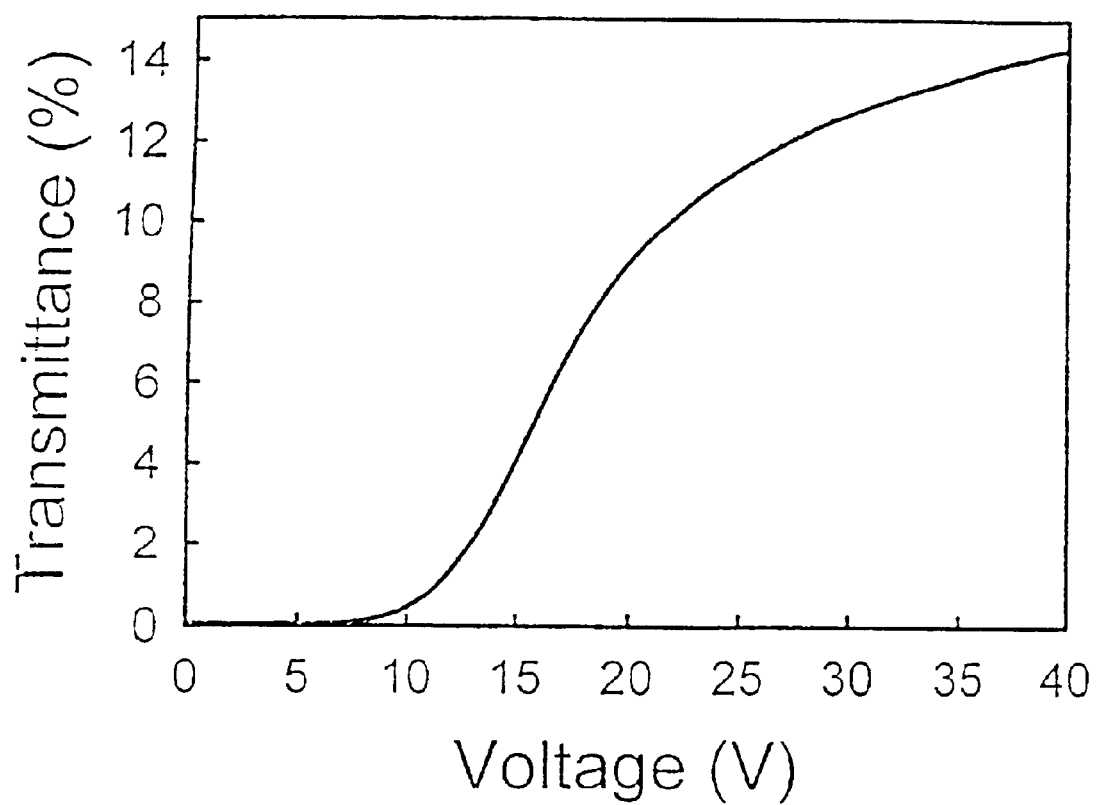
FIG. 10 is a graph showing a voltage-dependent optical transmittance curve in a liquid crystal display device according to this invention.

FIG. 10 shows the transmitted light intensity as a function of an applied voltage. The light transmission begins to occur at the applied voltage of about 7 volts, and the transmission becomes almost saturated at about 40 volts. Since the transmission characteristics in the normal direction are a function of $\sin^2(\delta/2)$ where $\delta$ ($=2\pi\Delta nd/\lambda$) is a phase retardation, in a case that a cell has $\Delta nd=\lambda/2$, the transmission will increase continuously with further increase of the voltage. The transmission-saturation voltage depends on the distance between the electrodes, the cell gap and the liquid crystal materials, i.e., $Vth=\pi 1/d(K_3/\epsilon_0\Delta\epsilon)^{1/2}$. Here, Vth is a threshold voltage of the liquid crystal display, 1 is an electrode distance, d is an effective cell gap, $\epsilon_0$ is a dielectric constant, $\epsilon\epsilon$ is a dielectric anisotropy constant, and $K_3$ is a bend elastic constant. Therefore, Vth can be reduced to about 5 V by controlling the cell gap, the electrode distance, etc. for optimized design.

Next, the dynamic behavior and microscopic observation of this liquid crystal display device is discussed. The rise time with an applied voltage of 40 volts is about 11 ms and the decay time is about 9 ms. This speed is almost the same as that of cell with the vertical alignment mode.

Figure 11A:
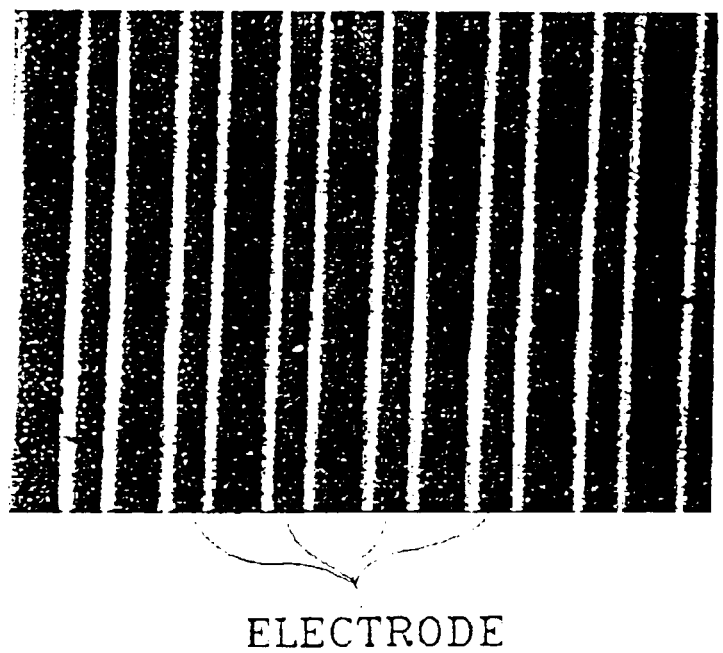
FIG. 11A and FIG. 11B show a transmittance pattern with an applied voltage in a liquid crystal display device according to this invention.
Figure 11B:
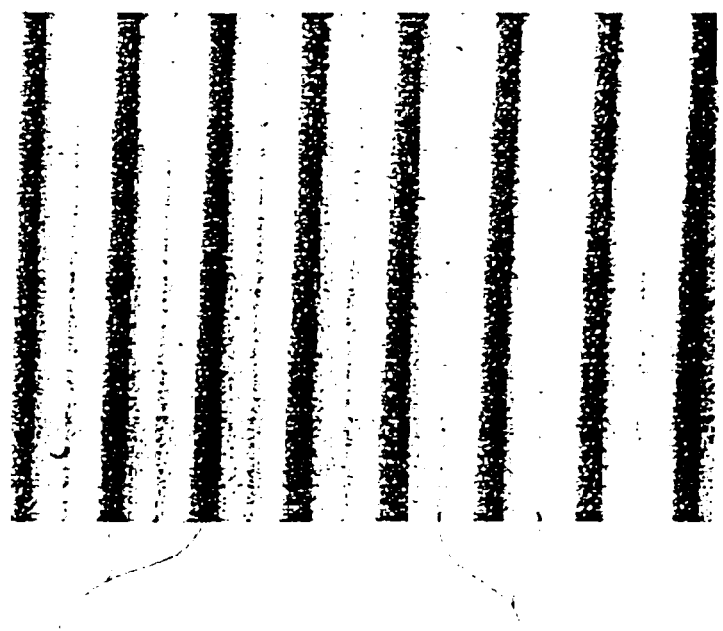

The transmission pattern is also observed by using a polarizing microscope. When a voltage below a threshold voltage is applied, the cell shows a completely dark state except for a region near the sphere spacers which are distributed so as to maintain the cell gap between the substrates. Sphere spacers are plastic vials distributed between the substrates so as to maintain the cell gap. In the absence of the electric field, in most regions, the liquid crystal molecules are arranged normal to the surfaces of the substrates. However, in the region of the sphere spacers the liquid crystal molecules are arranged along the surface of the spacers, so that the light is leaked since the molecules in such regions are not arranged exactly normal to the surfaces of the substrates. As the voltage increases above the threshold value, the transmittance begins to occur at the region near the electrodes and the transmission region extends to the whole space, as shown in FIGS. 11A and 11B. Disclination lines exist at the center portion between the electrodes since the liquid crystals do not move through the whole cell gap at the center portion, namely, the directors are pushed towards the center portion from both sides. The disclination lines are very stable, and are not disturbed even in the applied voltage of about 55 volts. Since the disclination lines do not move around the other area except the original area, they do not affect the display quality.

Figure 12:
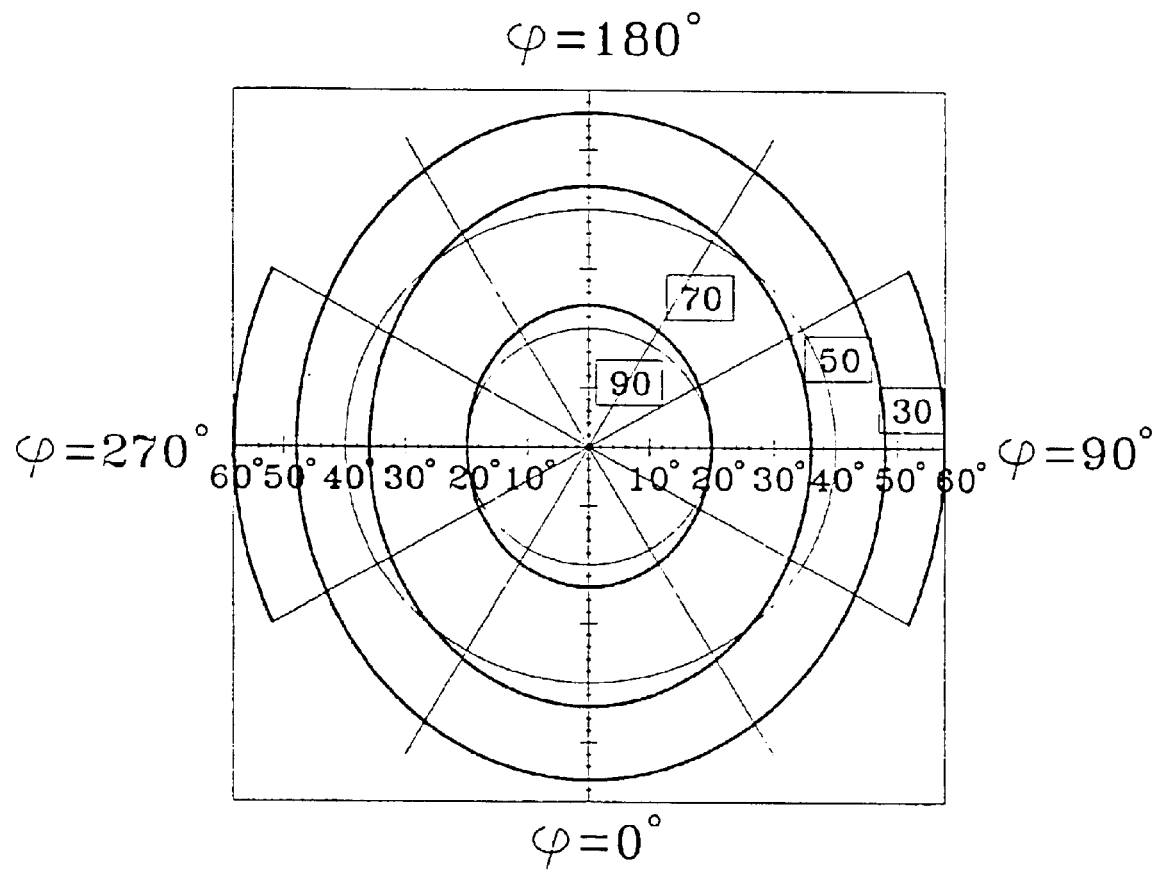
FIG. 12 shows brightness dependent on viewing angle in a liquid crystal display device according to this invention.
Figure 12:
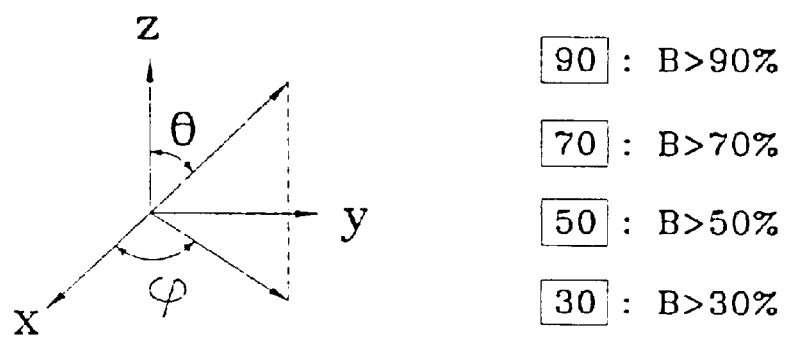

FIG. 12 shows the dependence of brightness on the viewing angle. The reference is the light intensity with a bias voltage of 40 volts at a direction normal to the screen. Thus, in FIG. 12, the numeral 90 within a box represents an illustrated region within which the brightness is above 90%. The numeral 70 represents a region where the brightness is above 70%. In a similar manner, each numeral within a box represents an illustrated region where the brightness is above the numeral barrier. As shown in FIG. 12, all of the illustrated regions show a uniform brightness. As can be seen from FIG. 12, the uniformity in brightness is greatly improved compared with that of the conventional cell associated with a single domain in deformation of vertical aligned phase (DAP). Normalized transmission exceeds 30% within a polar angle of 60 degrees in all directions. This results from the configuration of dual-domainlike LC director by the in-plane switching.

Figure 13:
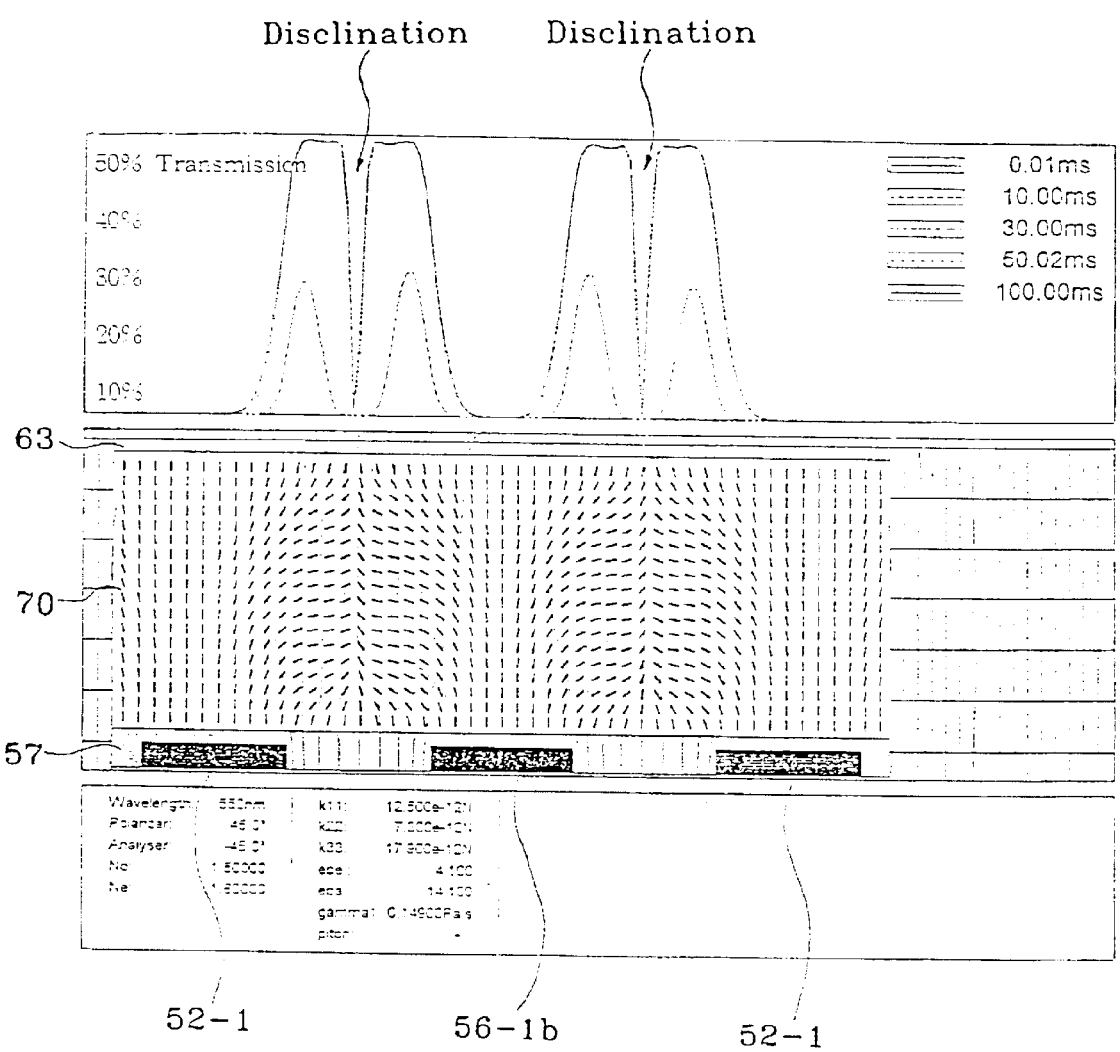
FIG. 13 is a simulation result of the liquid crystal display device according to this invention so as to measure a transmittance ratio.

FIG. 13 shows the simulation result of the liquid crystal display device according to the fourth embodiment of this invention. It is noted that upon the application of the electric field, the molecules which exist between the pixel electrode 56-1b and the counter electrode 52-1 are arranged in the shape of the electric field, as described above. The molecules which exist above 56-1b and 52-1 maintain the initial state since the space above the electrodes 56-1b and 52-1 has the same potential value as before application of the field. As shown, the molecules existing in a border region hold an equilibrium state without movement due to the force having a same value from the molecules within the two domains. Therefore, in this region, the light cannot pass through, so that a disinclination line occurs. In such liquid crystal display device the maximum transmittance is obtained at about 30 ms since the transmittance is saturated at about 30 ms. This result shows that the liquid crystal display device has a fast response time compared to the conventional liquid crystal display device of in-plane switching mode having a maximum transmittance at more than about 50 to 60 ms.

Figure 14:
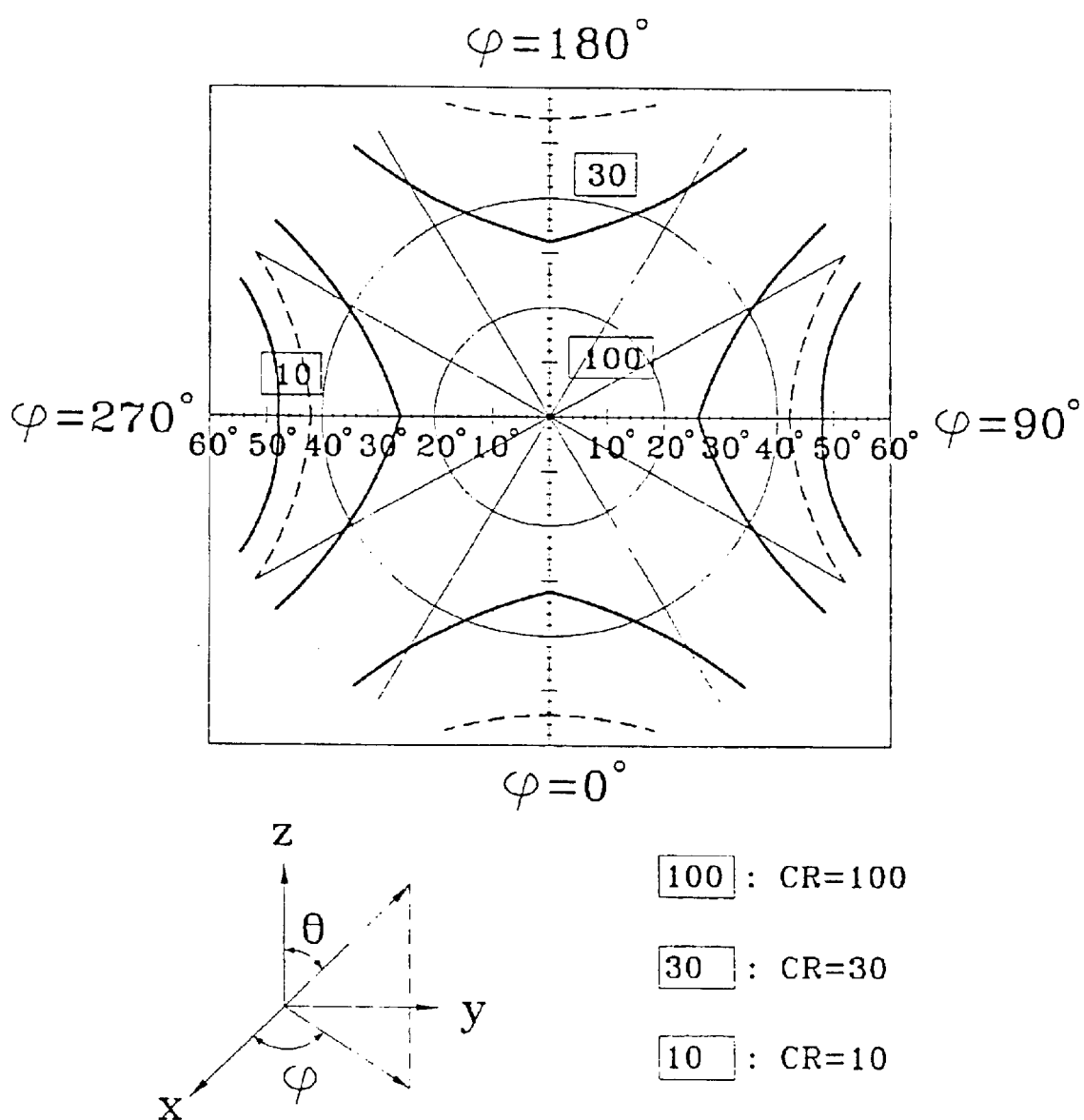
FIG. 14 is a graph showing a contrast ratio of a liquid crystal display device with a negative birefringent compensation plate according to this invention.

So as to confirm the increase of contrast by the optical compensating plate having a negative birefringence index, the contrast ratio of this device is measured. The result is shown in FIG. 14. A numeral 100 within a box represents a region where a contrast ratio is about 100%. A numeral 30 within a box represents a region where a contrast ration is 30%. A numeral 10 within a box represents a region where a contrast ration is 10%. As shown in FIG. 14, almost all regions represent a contrast ratio value above 10%. Therefore, it is noted that the viewing angle is very excellent. The optical compensating plate manufactured by Nitto Denko Co., is used. The optical compensating plate has a dimension of $(nx-nz)d=0.2\sim0.6$ $\mu$m at $\lambda=589$ nm. The liquid crystal display device having two domains within the liquid crystal layer between the electrodes clearly has fourfold and mirror plane symmetries as shown in iso-contrast curve of FIG. 14 wherein it can be seen that the region with the contrast ratio greater than 10 is superior to that of conventional TN cell and comparable to that of the dual-domain structure of the VA cell with the optical compensating film which is proposed by K. Ohmuro, et al., in SID 97 Digest, P 845, 1997. Especially, it is noted that the viewing angle characteristics in 45° diagonal direction are very excellent.

As described above, according to this invention, in the presence of the electric field, an elliptical electric field is generated and the liquid crystal molecules are thereby arranged symmetrically relative to a point in a central-area or region midway between the electrodes. As a result, since the liquid crystal layer is divided into two domains, a wide viewing angle with symmetry can be obtained. Without complicated processes the dual domain structure is easily obtained.

Moreover, in the absence of the electric field, the light leakage is prevented by the optical compensating plate and thus the screen becomes perfectly dark. Therefore, the contrast ratio is greatly improved.

Furthermore, in at least one embodiment of this invention, before the electric field is generated, the liquid crystal molecules are arranged such that the major axes thereof are normal to the substrates. After the electric field is applied, the molecules are tilted according to the shape of the field. Therefore, compared to the conventional liquid crystal display device of in-plane switching mode where liquid crystal molecules are first arranged in parallel with the substrates in the absence of the electric field and then twisted in the shape of the electric field in the presence of the electric field, the response time of the liquid crystal display device according to this invention is greatly improved.

Additionally, since the liquid crystals have positive dielectric constant anisotropy they therefore exhibit good purity and good reliability, and the quality of the device is greatly enhanced.

Further, since a dual domain structure is formed within the liquid crystal layer, when the viewer looks at the screen in all oblique directions, almost the same number of the major axes and the minor axes of the liquid crystal molecules are seen in the presence of the electric field. Therefore, a color shift which occurs in the conventional liquid crystal display device can be obviated.

It will be apparent to those skilled in the art that the liquid crystal display device having the liquid crystal layer with a multi-domain structure can be fabricated by employing the above described technology for forming two tilt domains according to this invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing two domains within a liquid crystal layer comprising the steps of:
    forming a pixel electrode and a common electrode on a surface of a substrate, the electrodes being separated from each other by a selected distance;

forming a liquid crystal layer having liquid crystal molecules on the substrate surface with the liquid crystal molecules aligned vertically with respect to the substrate surface; and applying an electric field between the two electrodes, wherein a domain boundary is formed midway between the electrodes within the liquid crystal layer, wherein the step of forming the liquid crystal layer comprises steps of forming a homeotropic alignment layer on the substrate surface on which the pixel and common electrodes are formed, and forming the liquid crystal layer on the homeotropic alignment layer, and wherein any additive used with the liquid crystal molecules is a non-dye additive.

2. A liquid crystal display device comprising:

a base substrate having a surface;

a pixel electrode formed on the surface of the base substrate;

a common electrode formed on the same surface of the base substrate, wherein the pixel electrode and the common electrode are spaced apart for application of an electric field therebetween;

a liquid crystal layer formed on the base substrate surface and including liquid crystal molecules for alignment normal to the base substrate surface in an absence of the electric field between two electrodes; and a second substrate together with said base substrate and said liquid crystal layer forming a panel upon which an optical compensating plate is formed, wherein in the presence of the electric field between the two electrodes, the molecules are tilted towards a central region between the two electrodes, and wherein any additive used with the liquid crystal molecules is a non-dye additive.

3. The liquid crystal display of claim 2, further comprising a homeotropic alignment layer formed adjacent at least one of upper and lower surfaces of the liquid crystal layer.

4. The liquid crystal display device of claim 2, wherein the liquid crystal layer is formed of a material having a property of positive dielectric anisotropy.

5. The liquid crystal display device of claim 2, wherein the optical compensating plate is made of a negatively birefringent index liquid crystal film.

6. The liquid crystal display device of claim 2, wherein the pixel electrode is a pixel electrode, and the common electrode is a counter electrode.

7. The liquid crystal display device of claim 6, wherein each of the pixel and counter electrodes is made of an transparent metal film.

8. The liquid crystal display device of claim 3, wherein the liquid crystal layer is formed of a material having a property of positive dielectric anisotropy.

9. The liquid crystal display device of claim 3, wherein the optical compensating plate is made of a liquid crystal film including the negatively birefringent index molecules.

10. The liquid crystal display device of claim 3, wherein the pixel electrode is a pixel electrode, and the second electrode common electrode is a counter electrode.

11. The liquid crystal display device of claim 10, wherein each of the pixel and counter electrodes is made of a transparent film.

12. A liquid crystal display device comprising:

a substrate;

a pixel electrode formed on a surface of the substrate;

a common electrode formed on the surface of the substrate, wherein the pixel electrode and the common electrode are spaced apart for application of an electric field therebetween;

a liquid crystal layer formed on the surface of the substrate and including liquid crystal molecules, a homeotropic alignment layer formed adjacent at least one of upper and lower surfaces of liquid crystal layer; and an optical compensating plate formed on a layer on at least one side of upper and lower portions of the liquid crystal layer, wherein in the presence of the electric field between the two electrodes, the molecules are tilted toward a central region between the two electrodes, and wherein any additive used with the liquid crystal molecules is a non-dye additive.

13. The liquid crystal display device of claim 12, wherein the optical compensating plate is made of a liquid crystal film including a plurality of molecules of negatively birefringent index molecules.

14. The liquid crystal display device of claim 12, wherein the liquid crystal molecules have a property of positive dielectric anisotropy.

15. The liquid crystal display device of claim 12, wherein the pixel electrode is a pixel electrode, and the common electrode is a counter electrode.

16. The liquid crystal display device of claim 15, wherein each of the pixel and counter electrodes is made of a transparent film.

17. A liquid crystal display device comprising:

a first substrate having an inner surface and an outer surface opposite the inner surface;

a second substrate disposed opposite the first substrate and having an inner surface and an outer surface opposite the inner surface;

a liquid crystal layer sandwiched between the inner surfaces of the two substrates and including liquid crystal molecules;

a pixel electrode and a common electrode formed on the inner surface of the first substrate, wherein the pixel electrode and the common electrode are spaced apart for application of an electric field therebetween;

homeotropic alignment layers respectively formed on the inner surface of the first substrate and on the inner surface of the second substrate; and an optical compensating plate disposed on at least one of the outer surfaces of the first and second substrates, wherein in a presence of the electric field between the two electrodes, the molecules are tilted from the respective electrodes towards a central region between the two electrodes, and wherein any additive used with the liquid crystal molecules is a non-dye additive.

18. The liquid crystal display device of claim 17, further comprising a polarizer disposed outside the first substrate.

19. The liquid crystal display device of claim 18, further comprising an analyzer layer disposed outside the second substrate.

20. The liquid crystal display device of claim 17, wherein the optical compensating plate is made of a liquid crystal film including a plurality of molecules of negative birefringent index.

21. The liquid crystal display device of claim 18, wherein an angle between an axis of the polarizer and a direction of the electric field is about 45 degrees.

22. The liquid crystal display device of claim 19, wherein an angle between the axis of the polarizer and an axis of the analyzer is about 90 degrees.

23. The liquid crystal display device of claim 17, wherein the liquid crystal layer is formed of a material having a property of positive dielectric anisotropy.

24. The liquid crystal display device of claim 17, wherein the pixel electrode is a pixel electrode, and the common electrode is a counter electrode.

25. The liquid crystal display device of claim 24, wherein each of the pixel and counter electrodes is made of a transparent metal film.

26. A liquid crystal display device, comprising:

a first substrate having an inner surface and an outer surface opposite the inner surface;

a second substrate having an inner surface and an outer surface opposite the inner surface and disposed opposite the first substrate;

a liquid crystal layer sandwiched between the inner surfaces of the two substrates and including liquid crystal molecules;

a pixel electrode and a counter electrode formed on the inner surface of the first substrate, wherein the pixel electrode and the counter electrode are spaced apart for application of an electric field therebetween for aligning the liquid crystal molecules between the two electrodes along electric field lines of the electric field;

homeotropic alignment layers respectively formed on the inner surface of the first substrate and on the inner surface of the second substrate;

a polarizer disposed on the outer surface of the first substrate;

an optical compensating plate disposed on the outer surface of the second substrate, and an analyzer disposed on the optical compensating plate, wherein in the presence of the electric field between the pixel electrode and the counter electrode, the molecules are tilted along said electric field lines towards a central region between the two electrodes where the liquid crystal molecules are aligned normal to the inner surfaces of the two substrates, and wherein any additive used with the liquid crystal molecules is a non-dye additive.

27. The liquid crystal display device of claim 26, wherein the liquid crystal layer is formed of a material having a positively dielectric anisotropy.

28. The liquid crystal display device of claim 26, wherein an angle between an axis of the polarizer and a direction of the electric field is about 45 degrees.

29. The liquid crystal display device of claim 26, wherein an angle between an axis of the polarizer and an axis of the analyzer is about 90 degrees.

30. The liquid crystal display device of claim 26, wherein the optical compensating plate is made of a liquid crystal film including a plurality of molecules of negative birefringence index.

31. The liquid crystal display device of claim 26, wherein each of the pixel and counter electrodes is made of a transparent metal film.

32. A liquid crystal display device comprising:

a first substrate having an inner surface and an outer surface opposite the inner surface;

a second substrate having an inner surface and an outer surface opposite the inner surface and disposed opposite the first substrate;

a plurality of gate bus lines and a plurality of data bus lines intersecting the plurality of gate bus lines, arranged in a matrix configuration on a surface of the first substrate and defining a plurality of pixel regions each bounded by a pair of the plurality of gate bus lines and a pair of the plurality of data bus lines;

a liquid crystal layer sandwiched between the inner surfaces of the two substrates and including liquid crystal molecules;

a pixel electrode and a counter electrode formed on the inner surface of the first substrate, wherein the pixel electrode and the counter electrode are spaced apart for application of an electric field therebetween for aligning the liquid crystal molecules between the two electrodes along electric field lines of the electric field;

a plurality of switching devices corresponding respectively to the plurality of pixel regions, each of the plurality of switching devices being connected to a corresponding one of the plurality of data bus lines and a corresponding one of the plurality of pixel electrodes;

homeotropic alignment layers respectively formed on the inner surface of the second substrate and on the inner surface of the first substrate wherein the molecules are aligned normal to said inner surfaces of the tow substrates in the absence of said electric field;

a polarizer attached to the outer surface of the first substrate;

an optical compensating plate disposed on the outer surface of the second substrate;

an analyzer disposed on the optical compensating plate, wherein in the presence of the electric field between the pixel electrode and the counter electrode, the molecules are tilted along said electric field lines towards a central region between the two electrodes wherein the molecules remain aligned normal to said inner surfaces of the substrates, and wherein any additive used with the liquid crystal molecules is a non-dye additive.

33. The liquid crystal display device of claim 32, wherein the liquid crystal layer is formed of a material having a property of positive dielectric anisotropy.

34. The liquid crystal display device of claim 32, wherein an angle between an axis of the polarizer and a direction of the electric field is about 45 degrees.

35. The liquid crystal display device of claim 34, wherein an angle between an axis of the polarizer and an axis of the analyzer is about 90 degrees.

36. The liquid crystal display device of claim 32, wherein the optical compensating plate is made of a liquid crystal film including a plurality of molecules of negative birefringence index.

37. The liquid crystal display device of claim 32, wherein each of the pixel and counter electrodes is made of a transparent metal film.

38. A method for producing two domains within a liquid crystal layer comprising the steps of:

forming a pixel electrode and a common electrode on a surface of a substrate, the electrodes being separated from each other by a selected distance;

forming a liquid crystal layer having liquid crystal molecules on the substrate surface with the liquid crystal molecules aligned vertically with respect to the substrate surface; and applying an electric field between the two electrodes, wherein a domain boundary is formed midway between the electrodes within the liquid crystal layer, wherein the step of forming the liquid crystal layer comprises steps of forming a homeotropic alignment layer on the substrate surface on which the pixel and common electrodes are formed, and forming the liquid crystal layer on the homeotropic alignment layer, and wherein any additive used with the liquid crystal molecules is a non-dye additive.

* * * * *

UNITED STATES PATENT AND TRADEMARK OFFICE
CERTIFICATE OF CORRECTION

PATENT NO. : 6,781,657 B1
DATED : August 24, 2004
INVENTOR(S) : Kim et al.

It is certified that error appears in the above-identified patent and that said Letters Patent is hereby corrected as shown below:

Column 6,
Line 46, please cancel "$\epsilon - \epsilon_\perp$" and substititute -- $\epsilon_\parallel - \epsilon_\perp$ -- therefor; and
Line 47, please change "$\epsilon$" to -- $\epsilon_\parallel$ --.

Column 8,
Line 15, please change "And" to -- $\Delta$nd --.

Column 9,
Line 14, please cancel "$\Delta nd \equiv \lambda/2$" and substitute -- $\Delta nd \cong \lambda/2$ -- therefor.

Column 10,
Line 33, cancel "$T = T\sin^2(2\chi)\sin^2(\pi \bullet \Delta nd/\lambda)$" and substitute -- $T = T_0 \sin^2(2\chi) \sin^2(\pi \bullet \Delta nd/\lambda)$ -- therefor.

Column 14,
Line 56, please change "$\epsilon \epsilon$" to -- $\Delta \epsilon$ --.

Column 16,
Line 18, please cancel "-" after "central".

Column 18,
Line 2, please change "," to -- ; --.

Signed and Sealed this

Twenty-fifth Day of January, 2005

JON W. DUDAS
*Director of the United States Patent and Trademark Office*